United States Patent [19]

Fujita et al.

[11] Patent Number: 5,523,793
[45] Date of Patent: Jun. 4, 1996

[54] IMAGE DATA ENCODING AND DECODING APPARATUS UTILIZING CHARACTERISTIC POINTS OF IMAGE DATA AND METHODS THEREOF

[75] Inventors: Masahiro Fujita, Saitama; Jin Sato; Hiroshi Abe, both of Tokyo, all of Japan

[73] Assignee: Sony Corporation, Tokyo, Japan

[21] Appl. No.: 300,227

[22] Filed: Sep. 6, 1994

[30] Foreign Application Priority Data

Sep. 7, 1993 [JP] Japan .................. 5-221661

[51] Int. Cl.$^6$ .................. H04N 7/30
[52] U.S. Cl. .................. 348/437; 348/396; 348/397; 382/166
[58] Field of Search .................. 348/390, 391, 348/396, 397, 398, 403, 437; 382/166; H04N 7/30

[56] References Cited

U.S. PATENT DOCUMENTS

| | | | |
|---|---|---|---|
| 4,663,660 | 5/1987 | Fedola et al. | 348/397 |
| 4,857,992 | 8/1989 | Richards | 348/397 |
| 4,987,480 | 1/1991 | Lippman et al. | 348/398 |
| 5,079,621 | 1/1992 | Daly | 348/390 |
| 5,113,256 | 5/1992 | Citta | 348/390 |
| 5,122,873 | 6/1992 | Golin | 348/390 |
| 5,237,409 | 8/1993 | Yamaguchi | 348/391 |
| 5,341,442 | 8/1994 | Barrett | 382/166 |
| 5,359,438 | 10/1994 | Maeda | 348/396 |
| 5,379,757 | 1/1995 | Hiyama | 348/397 |

*Primary Examiner*—Victor R. Kostak
*Attorney, Agent, or Firm*—William S. Frommer; Alvin Sinderbrand

[57] ABSTRACT

An image data encoding apparatus and decoding apparatus which perform encoding and decoding making effective use of the correlation of positional information of characteristic points of the luminance signal element and chrominance signal elements of image data. A first signal analysis unit analyzes the luminance signal Y, from which the low frequency component has been removed, using a filter having several resolution scales s, detects and connects the characteristic points from the results of the analysis, and produces line data. Based on the line data, the values of the results of analysis are extracted. A second signal analysis unit performs similar processing on the chrominance signal U and a third signal analysis unit performs similar processing on the chrominance signal V. First to third analysis result compression units compress the input signal by predictive encoding etc. The first to third signal analysis units produce the low frequency components of the luminance signal Y and the chrominance signals U and V. A low frequency component compression unit compresses the low frequency components. A transformation unit multiplexes and modulates the signal obtained by the above processing and inputs it to the transmission medium etc. connected to the encoding apparatus.

13 Claims, 10 Drawing Sheets

101,102,103; SIGNAL ANALYSIS UNIT
104; LINE DATA COMPRESSION UNIT
105,106,107; ANALYSIS RESULT COMPRESSION UNIT
108; LOW FREQUENCY COMPONENT COMPRESSION UNIT
109; MODULATION UNIT 201, 202, 211, 212, 221, 222; FILTER
203, 213, 223; LOW FREQUENCY COMPONENT PROCESSING UNIT
204, 214, 224; COMPUTATION CIRCUIT
205, 215, 225; DATA EXTRACTION UNIT
206; CHARACTERISTIC POINT DETECTION UNIT
207; LINE DATA CALCULATION UNIT

FIG. 6

|  | dx = −1 | dx = 0 | dx = +1 |
|---|---|---|---|
| dy = −1 | 0 | 1 | 2 |
| dy = 0 | 3 | $(x_0, y_0)$ | 4 |
| dy = +1 | 5 | 6 | 7 |

30

301,302,303; SIGNAL INVERSE TRANSFORMATION UNIT
304; COMPUTATION CIRCUIT
305,306,307; EXPANSION UNIT
308; LOW FREQUENCY COMPONENT EXPANSION UNIT
309; DEMODULATION UNIT

IMAGE DATA ENCODING AND DECODING APPARATUS UTILIZING CHARACTERISTIC POINTS OF IMAGE DATA AND METHODS THEREOF

BACKGROUND OF THE INVENTION

1. Field of the Invention

The present invention relates to an image data encoding apparatus and decoding apparatus for extracting information on characteristic points of image data and compressing and expanding the image data based on the information of the characteristic points.

2. Description of the Related Art

One of the methods conventionally used for compressing and encoding moving picture data has been the MPEG (Moving Picture Coding Experts Group) standard.

When encoding color moving picture data by the MPEG standard, moving compensation processing is performed using the luminance signal Y among the luminance signal Y and chrominance signals U and V.

Further, discrete cosine transformation (DCT) processing is performed independently on the residual signals of the luminance signal Y and chrominance signals U and V.

In usual transformation and encoding systems of moving picture data such as the MPEG standard explained above, positive utilization has not been made of the close correlation between the luminance signal Y element and chrominance signal U and V elements constituting the moving picture data or among the red signal (R) element, green signal (G) element, and blue signal (B) element despite the existence of that correlation.

Further, at the characteristic points, such as the edges between one object and another in a picture, generally the luminance signal (Y) element and chrominance signal (U, V) elements of the moving picture data and color signal (R, G, B) elements have a very close relationship with each other.

Even in an encoding system for moving picture data using for example the positional information of the above characteristic points of moving picture data, for example, an encoding system using wavelets, there is still not known any system which makes positive utilization of the correlation between the luminance signal element and chrominance signal elements, or among the color signal elements.

SUMMARY OF THE INVENTION

The present invention was made in consideration of the above problems in the related art and has as its object the provision of an image data encoding apparatus and decoding apparatus, in an encoding system using the positional information of characteristic points of moving picture data, which make positive use of the similarity of the positional information of the characteristic points of the luminance signal element and chrominance signal elements or the color signal elements.

According to the present invention, there, is provided, an image data encoding apparatus of the present invention including:

detecting means for detecting characteristic points of one or more signal elements in a subject signal including a plurality of signal elements, and analyzing and encoding means for analyzing the signal elements at part or all of the characteristic points and encoding the results of the analysis and the positional information of the corresponding characteristic points.

At least one of the signal elements of the plurality of signal elements of moving picture data, for example, the luminance signal Y element and chrominance signal U and V elements, is analyzed to find the characteristic points.

The positional information of the thus found characteristic points are encoded and the analyzed values of the signal elements at the positions of the characteristic points are encoded to compress and encode the moving picture data.

Using the signals relating to the characteristic points of the thus encoded moving picture data and the analysis values of one or more signal elements at the positions of the same, the positions of the characteristic points are decoded, the analysis values of the signal elements at the decoded positions of the characteristic points are decoded, and the source moving picture data is synthesized from the analyzed values of the signal elements present at just the characteristic points so as to expand and decode the moving picture data.

It is further characterized in that the above subject signal is a color moving picture signal and the signal elements are the luminance signal and chrominance signals.

It is further characterized in that the subject signal is a color moving picture signal and the signal elements are color signals corresponding to the three primary colors.

It is further characterized in that the chracteristic points are edges of the color moving picture signal.

It is further characterized in that the analysis of the signal elements is performed by filtering the subject signal by primary differentiation type analysis filters.

The image data decoding apparatus of the present invention is an apparatus for decoding an encoded signal obtained by encoding results of analysis of signal elements and positional information of corresponding characteristic points at part or all of the characteristic points of one or more signal elements in a subject signal including a plurality of signal elements, in which the results of analysis and the positional information of the corresponding characteristic points are found based on the encoded signal and the subject signal is decoded based on the results of analysis and positional information.

Further, the subject signal and characteristic points are the same as mentioned above. The results of analysis are found by the same type of method as above.

The image data processing system of the present invention performs encoding of a subject signal by the above image data encoding apparatus and performs decoding of the encoded subject signal by the image data decoding apparatus.

The image data encoding method of the present invention detects characteristic points of one or more signal elements in a subject signal including a plurality of signal elements, analyzes the signal elements at part or all of the characteristic points, and encodes the results of the analysis and the positional information of the corresponding characteristic points.

The image data decoding method of the present invention uses the encoded signal obtained by encoding results of analysis of signal elements and positional information of corresponding characteristic points at part or all of the characteristics points of one or more signal elements in a subject signal including a plurality of signal elements so as to find the results of analysis and the positional information of the corresponding characteristic points and decodes the subject signal based on the results of analysis and positional information.

BRIEF DESCRIPTION OF THE DRAWINGS

The above and other objects and features of the present invention will be more apparent from the following description with reference to the accompanying drawings, wherein:

FIG. 6 is a view explaining neighborhood pixels of image data;

DESCRIPTION OF THE PREFERRED EMBODIMENTS

Figure 1:
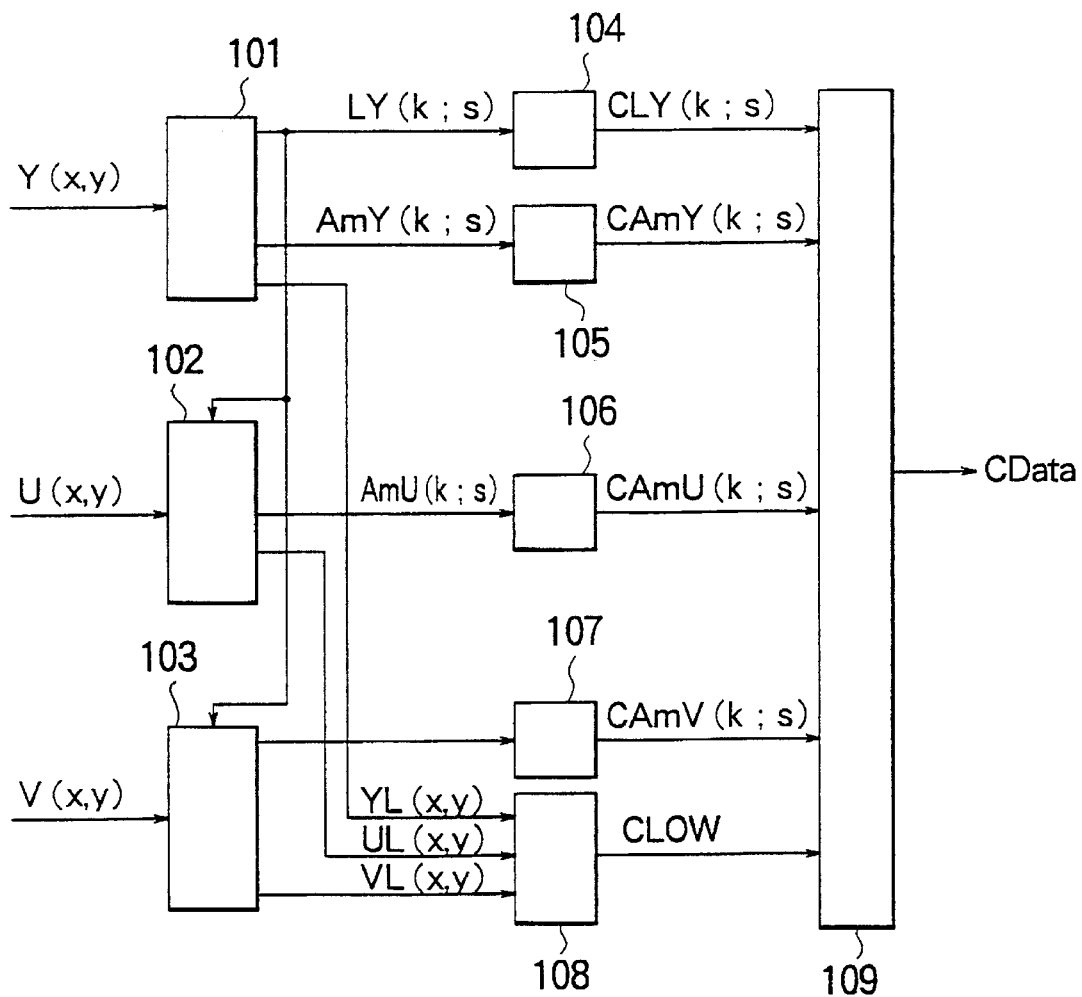
FIG. 1 is a view of the configuration of an encoding apparatus of a first embodiment of the present invention.

Before explaining the image data encoding apparatus and decoding apparatus of the present invention, an explanation will be made of the principle of the method of extracting the characteristic points of the image data, compressing and encoding the image data based on the positional information of the characteristic points etc., and expanding and decoding the thus compressed and encoded moving picture data.

In recent years, as one technique for the analysis and synthesis of an image signal etc., the method of taking note of the edge of a signal, that is, the edge between an object and the background in an image signal, and synthesizing the source signal from the information at the edge of the signal has been reported.

For example, one of the above methods is the method of signal analysis and synthesis disclosed in Second Generation Compact Image Coding With Wavelet (Wavelets-Tutorial in Theory and Applications, II, pp. 655 to 678, 1991) by Jacques Froment and Stephane Mallet (Reference 1).

First, assume the one-dimensional signal f(x).

In this example, first, the signal f(x) is analyzed using the multiple resolution method.

Here, the "multiple resolution method" means the method of analysis of a signal using filters having a plurality of different resolutions.

The characteristics of analysis filters used for analysis using the multiple resolution method are expressed by the function $\phi_a(x)$.

The function $\phi_a(x)$ is expressed by the following equation in the case of a frequency domain ω:

$$\hat{\phi}_a(\omega) = -i\omega \left[ \frac{\sin(\omega/4a)}{(\omega/4a)} \right]^3 \quad (1)$$

where, a of the function $\phi_a(x)$ shows the scale at the multiple resolutions.

Further $\theta_a$, the i in equation 1 shows an imaginary number. Shows a Fourier transformation of the function $\theta_a$ (same below).

This is the result of differentiation of the function θ(x) at the time (real) domain x of the function expressed by the following equation at the same frequency domain ω:

$$\hat{\theta}_a(\omega) = \left[ \frac{\sin(\omega/4a)}{(\omega/4a)} \right]^3 \quad (2)$$

The result of convolution of the filter $\phi_a(x)$ and the signal f(x) is expressed as the function $W_a f(x)$.

Reference 1 shows that it is possible to approximate a source signal of the time domain using just the filter output $W_a(f(_a x_n))$ at a position $(_a x_n)$ (where n is a natural number) giving the maximal value of the amplitude $|W_a f(x)|$.

Before explaining the reproduction of the signal from the maximal value, an explanation will be made about the reconstruction of the source signal f(x) from $W_a f(x)$.

The method described here is called the "wavelet" method and has been the subject of active research in recent years.

When the analysis function is expressed by the following equation:

$$\phi_j(\omega) = -i\omega[\sin(2^{-j}\omega/4)/(2^{-j}\omega/4)]^3 \quad (3)$$

The filter $\phi_j^*(x)$ used for the signal synthesis is expressed by the following equation:

$$\hat{\phi}_j^*(\omega) = \frac{\overline{\hat{\phi}_j(\omega)}}{\sum_{j=j^1}^{jJ} \|\hat{\phi}(2^{-j}\omega)\|^2} \quad (4)$$

Here, the line-above the function $\phi_j(\omega)$ indicates complex conjugation of the function $\phi_j(\omega)$. Further, the scale a is selected so that $a=2^j$, where j=j1, ..., jJ.

Here, an overall look will be taken of the analysis and synthesis. If the source signal is $f_0(x)$, then $$S_{j,J}(x) = \theta_{j,J} * f_0(x) \quad (5)$$

$$f(x) = f_0(x) - S_{j,J}(x) \quad (6)$$

Here, the asterisk in equation 5 shows a convolution operation (calculation).

$$W_j f(x) = \phi_j(x) * f(x) \quad (7)$$

where, j=j1, ..., jJ, the analyis and synthesis are performed as follows:

$$f(x) = \sum_{j=J^1}^{jJ} \phi_j^*(x) * W_j f(x) \quad (8)$$

$$f_0(x) = f(x) + S_{j,J}(x) \quad (9)$$

In this way, it is possible to reproduce the source signal $f_0(x)$ from $W_j f(x)$ and $s_{(j,J)}(x)$.

Accordingly, by interpolation of $W_j f(x)$ from the previously mentioned $W_j f(_j x_n)$, it is possible to approximate the $W_j f(x)$ and obtain an approximation of f by the above inverse transformation.

The interpolation method is described below.

If the function obtained by interpolation is $W_j f(x)$, then, the function of $$e(x) = W_j f(x) - {}^1 W_j f(x) \quad (10)$$

can be transformed to the format of $$e(x) = \alpha \exp(Ax) + \beta \exp(-Ax) \quad (11)$$

Further, the function passes through two points $_jx_n$ and $_jx_{(n+1)}$, so that fact is used to obtain the equation 12 and equation 13:

$$e(_jx_n) = W_jf(_jx_n) - 'W_jf(_jx_n) \quad (12)$$

$$e(_jx_{n+1}) = W_jf(_jx_{n+1}) - 'W_jf(_jx_{n+1}) \quad (13)$$

Equation 12 and equation 13 are substituted into equation 11 to find the prameters α and β and update the interpolation function as shown in the following equation:

$$'W_jf(x) = 'W_jf(x) + \alpha \exp(-Ax) + \beta \exp(-Ax) \quad (14)$$

The thus updated interpolation function and equation 8 are used to find the estimated value f'(x) of the signal f(x) and equation 7 is used again to redefine $W_jf(x)$.

By repeating the above processing, it is possible to update f'(x) and reconstruct f(x).

Finally, equation 9 is used to obtain $f_0(x)$.

Figure 2:
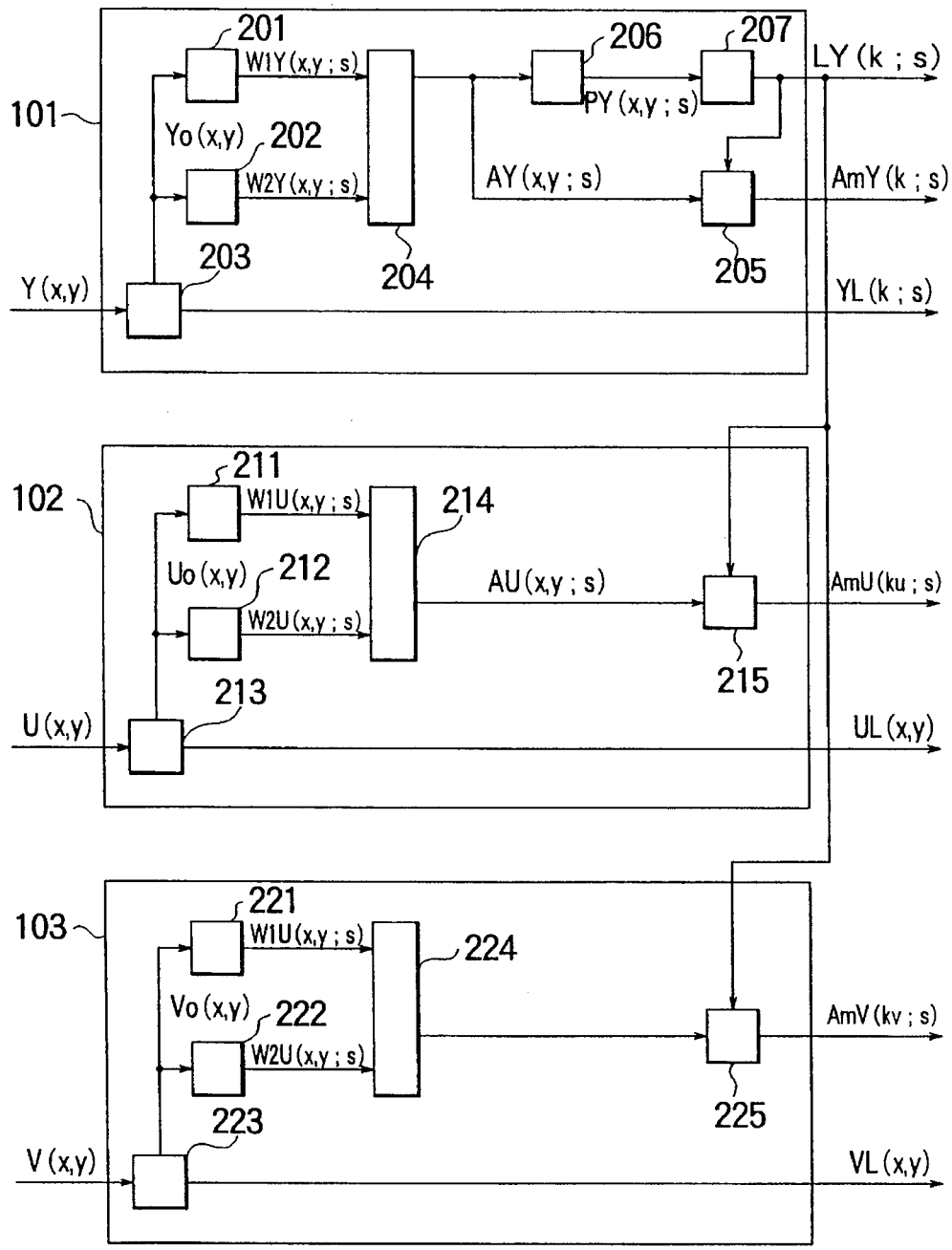
FIG. 2 is a view of the configuration of the different signal analysis units shown in FIG. 1.
Figure 3:
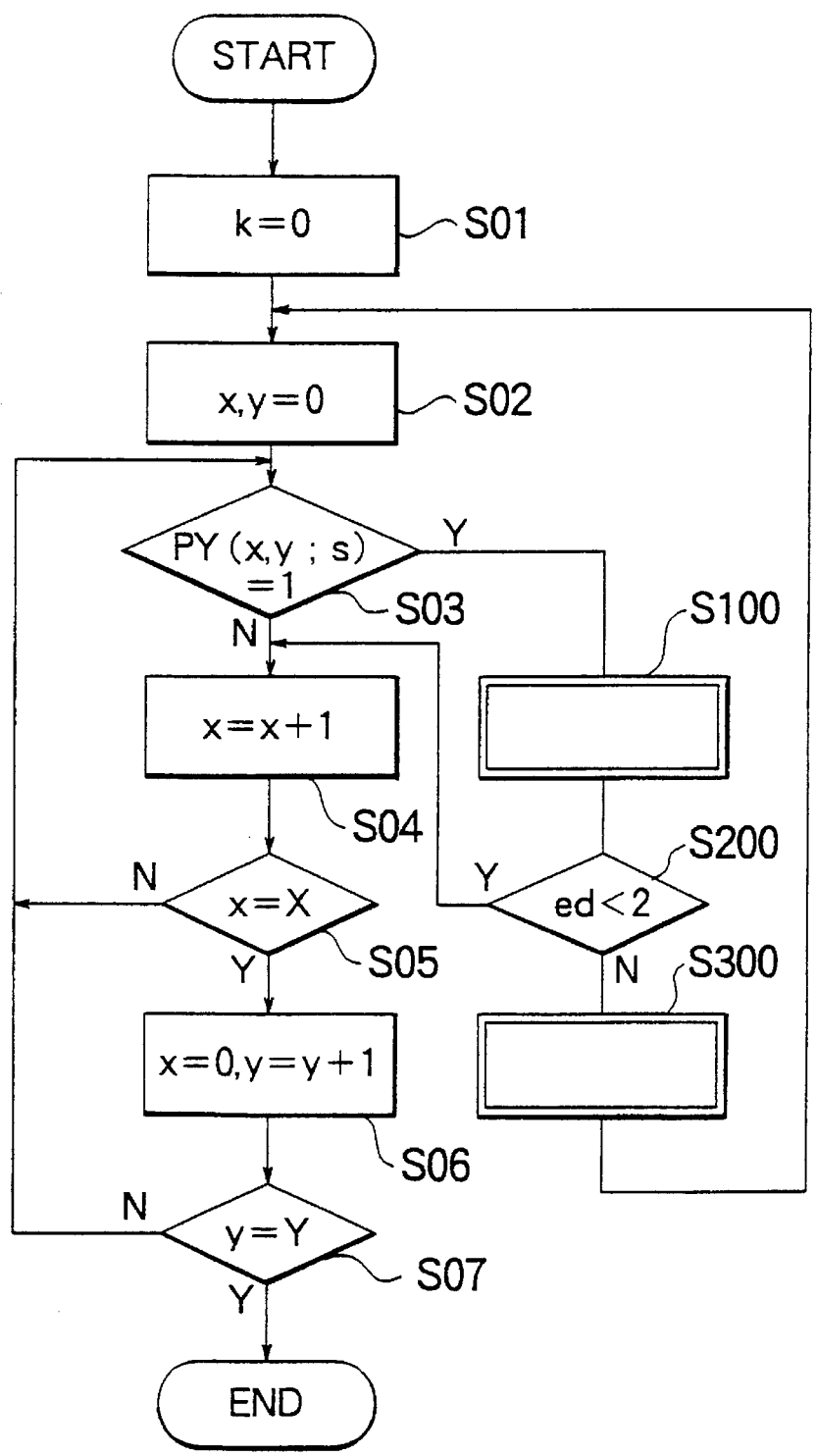
FIG. 3 is a flow chart of the processing of S100 shown in FIG. 2.

An explanation will be now made of the encoding apparatus 10 as a first embodiment of the present invention referring to FIG. 1 to FIG. 3.

The encoding apparatus 10 for example detects the characteristic points of color moving picture data, including three types of signals as signal elements, that is, the luminance signal Y and the two chrominance signals U and V, analyzes the signal elements at the characteristic points, and compresses and encodes the results of the analysis together with the positional information of the characteristic points.

FIG. 1 is a view of the configuration of the encoding apparatus 10 of the present invention.

Below, the luminance signal Y and the chrominance signals U and V will be expressed as the luminance signal Y(x,y), the chrominance signal U(x,y), and chrominance signal V(x,y) giving them correspondence with the two-dimensional coordinates (x,y) of the image data.

In FIG. 1, a signal analysis unit 101 removes the low frequency component of the luminance signal Y(x,y) of the two-dimensional format image data which is input so as to produce the signal Y0(k;s).

Next, the signal Y0(x,y) is analyzed by filters having several resolution scales s to extract the characteristic points.

Further, the extracted characteristic points are connected to produce the line data LY(k;s) and the line data LY(k;s) is input to a line data compression unit 104 and signal analysis units 102 and 103.

Further, the signal AmY(k;s) is input to an analysis result compression 105 as the results of the analysis of the luminance signal Y(x,y) at the characteristic points shown by the line data LY(k;s).

Here, k is a unique number given to the line data LY(k;s). A "characteristic point" is a characterizing point in the image data, such as an edge present at the boundary between an object and background in the image data.

The signal analysis unit 102 removes the low frequency component of the input chrominance signal U(x,y) to obtain the signal U0(x,y), analyses the signal U0(x,y) by filters having several resolution scales s at the characteristic points of the image data shown by the line data LY(k;s) input from the signal analysis unit 101, and inputs the signal AmU(k;s) as the results of the analysis to the analysis result compression unit 106.

The signal analysis unit 103 removes the low frequency component of the input chrominance signal V(x,y) to obtain the signal V0(x,y), analyses the signal V0(x,y) by filters having several resolution scales s at the characteristic points of the image data shown by the line data LY(k;s) input from the signal analysis unit 101, and inputs the signal AmV(k;s) as the results of the analysis to the analysis result compression unit 107.

The configurations of the signal analysis units 101 to 103 will be explained later referring to FIG. 2.

The line data compression unit 104 compresses the line data LY(k;s) input from the signal analysis unit 101 to data of 3 bits per point by the method of chain encoding etc. mentioned later and inputs the result of compression as the signal CLY(k;s) to the modulation unit 109.

The compression operation of the computation circuit 104 will be explained below.

First, the coordinates of the end point of the line data LY(k;s) are stored without being compressed.

The coordinates of the starting point of the line data LY(k;s) are stored in the later mentioned storage regions line [k][1].x and line [k][1].y.

For example, assuming the number of pixels of the image to be 256×256, 8 bits are required for the x-axis data and the y-axis data for showing the coordinates.

To compress this amount of data, the positions of the characteristic points other than the starting point are shown by connection to one of the neighborhood pixels in the line of characteristic points.

Accordingly, in this example, an amount of data requiring 8×8 bits can be compressed to 3 bits.

Therefore, the signal CYL(k,s) becomes the following data series.

First, the number k(s) of the lines at a certain resolution scale s is sent to the modulation unit 109. Next, the length of the line and the coordinates (x,y) of the starting point are sent to the modulation unit 109. Then, data showing the direction of connection of the end point is continuously sent in 3-bit units.

The analysis result compression unit 105 compresses the signal AmY(k;s) input from the signal analysis unit 101 by the predictive encoding system etc. and inputs the result of the compression as the signal CAmY(k;s) to the modulation unit 109.

The analysis result compression unit 106 compresses the signal AmU(k;s) input from the signal analysis unit 102 by the predictive encoding system etc. and inputs the result of the compression as the signal CAmU(k;s) to the modulation unit 109.

The analysis result compression unit 107 compresses the signal AmV(k;s) input from the signal analysis unit 103 by the predictive encoding system etc. and inputs the result of the compression as the signal CAmV(k;s) to the modulation unit 109.

In the first embodiment, the compression at the analysis result compression units 105 to 107 is performed for example by the simplest DPCM system.

That is, the difference from the analysis value at the previous characteristic point on a line is taken and that difference is suitably quantized.

The low frequency component compression unit 108 compresses the signals YL(i,j), UL(i,j), and VL(i,j).

The signals input from the signal analysis units 101 to 103 to the low frequency component compression unit 108 are so-called low pass filter outputs, so the number of samplings can be reduced by thinning.

In the first embodiment, considering the characteristics of a low pass filter defined by equation 18, it can be reproduced the source signal when $2^s$ sample data of the sample series of the source data are used.

Accordingly, the thinning processing is shown by the following equations using (i,j) as the parameters showing the coordinates of the image.

$$YL'(i,j)=YL(j-2^s, j-2^s) \quad (15)$$

$$UL'(i,j)=UL(i-2^s, j-2^s) \quad (16)$$

$$VL'(i,j)=VL(i-2^s, j-2^s) \quad (17)$$

The results of the thinning of the above equations are given as the signals YL'(i,j), UL'(i,j), and VL'(i,j).

Here, the numerical values i and j are integers of at least 0 giving $i \cdot 2^s < x$, $j \cdot 2^s < y$.

The low frequency component compression unit 108 further performs two-dimensional compression processing such as DCT processing on the signals YL'(i,j), UL'(i,j), and VL'(i,j) and inputs the results as the signal CLOW to the modulation unit 109.

The modulation unit 109 multiplexes the signal CLY(k;s), signal CAmY(k;s), signal CAmU(k;s), signal CAmV(k;s), and signal CLOW obtained by the processing of the signal elements of the image data in the line data compression unit 104, the analysis result compression units 105 to 107, and the low frequency component compression unit 108, adds error correction codes, performs predetermined modulation, and outputs the results as the signal CData.

The signal CData is supplied to an optical disk recording apparatus (not shown), for example, connected to the encoding apparatus 10.

FIG. 2 is a view of the configuration of the signal analysis units 101 to 103 shown in FIG. 1.

In FIG. 2, the low frequency component processing unit 203 separates the low frequency component from the input luminance signal Y(x,y), inputs the result as the signal Y0(x,y) to the filters 201 and 202, compresses the separated low frequency component, and outputs it as the signal YL(x, y).

An explanation will be made below of the method of separation of the low frequency component from the luminance signal Y(x,y) and the compression of the low frequency component.

The low frequency component processing unit 203 calculates the impulse response W0(x,y) of the luminance signal Y (x, y).

The computation for calculating the impulse response W0(x,y) is expressed by the following equation:

$$W0(x,y)=G(x,y;s) \quad (18)$$

The low frequency component processing unit 203 uses the impulse response W0(x,y) to perform convolution processing on the luminance signal Y(x,y) for compression of the same and outputs the results as the signal YL(x,y).

Further, the low frequency component processing unit 203 subtracts the signal YL(x,y) from the luminance signal Y(x,y) to produce the signal Y0(x,y).

The convolution operation at the low frequency component processing unit 203 and the operation for calculation of the signal Y0(x,y) are shown by the following equations:

$$YL(x,y)=W0**Y(x,y) \quad (19)$$

where, ** shows the two-dimensional convolution integration relating to x,y or the convolution accumulation value of the discrete signal.

$$Y0(x,y)=Y(x,y)-YL(x,y) \quad (20)$$

The filter 201 is a first-order differential type multiple resolution filter of a smoothing function. It analyzes the signal Y0(x,y), obtained after removal of the low frequency component from the luminance signal Y(x,y) by the low frequency component processing circuit 203, by filters having several resolution scales s and inputs the results of analysis as the impulse response W1Y(x,y;s) of the filter 201 to the computation circuit 204.

The filter 202 is a first-order differential type multiple resolution filter of a smoothing function. It analyzes the luminance signal Y(x,y) by several resolution scales s and inputs the results of analysis as the impulse response W2Y(x,y;s) of the filter 202 to the computation circuit 204.

The processing at the filters 201 and 202 are shown by the following equations:

$$W1(x,y;s) = \frac{\partial}{\partial x} G(x,y;s) \quad (21)$$

$$W2(x,y;s) = \frac{\partial}{\partial y} G(x,y;s) \quad (22)$$

In equation 18 and equation 19, the function G(x,y;s) is a predetermined smoothing function. For example, the Gaussian function of the following equation is used:

$$G(x,y;s)=N(s) \exp [-(x^2+y^2)/2a^2] \quad (23)$$

In equation 23, N(s) is a predetermined constant for normalization and is expressed by the following equation:

$$N(s)=1/(2\pi a^2) \quad (24)$$

That is, in the filters 201 and 202, equation 16 and equation 17 are substituted in equation 18 and equation 19 and the following equations are computed:

$$W1Y(x,y;s)=W1(x,y;s)**Yo(x,y) \quad (25)$$

$$W2Y(x,y;s)=W2(x,y;s)**Yo(x,y) \quad (26)$$

The computation circuit 204 squares and adds the impulse response W1Y(x,y;s) and the impulse response W2Y(x,y;s), calculates the square root of the results of the addition, and produces the signal AY(x,y;s).

$$AY(x,y;s)=[W1Y(x,y;s)^2+W2Y(x,y;s)^2]^{1/2} \quad (27)$$

Here, a description will be given of another signal PhY(x, y;s) necessary in the processing of the decoding apparatus 30 in the second embodiment.

The signal PhY(x,y;s) is not encoded in the encoding apparatus 10 in the first embodiment.

The signal PhY(x,y;s) is defined by the following equation:

$$PhY(x,y;s)=\text{atan }[W2Y(x,y;s), W1Y(x,y;s)] \quad (28)$$

Here, atan[y,x] is a function for finding the phase data ph ($-\pi \leq ph \leq \pi$) giving y=sin(ph) and x=cos(ph).

Accordingly, it is possible to use the signal Ay(x,y;s) and the signal PhY(x,y;s) to find the impulse response W1Y(x, y;s) and the impulse response W2Y(x,y;s).

$$W1Y(x,y)=AY(x,y) \cos [PhY(x,y;s)] \quad (29)$$

$$W2(x,y)=AY(x,y) \sin [PhY(x,y;s)] \quad (30)$$

In the first embodiment, however, data relating to the signal PhY(x,y;s) is not encoded due to use of the tangential direction of the line data LY(k;s) in the decoding apparatus 30.

The characteristic point detection unit 206 detects the positional information PY(x,y;s) of the characteristic points based on the signal AY(x,y;s) calculated at the computation circuit 204 and inputs the results to the data extraction unit 205 and the line data calculation unit 207.

The characteristic points of the signal AY(x,y;s) are defined as points giving the maximal points of the signal AY(x,y;s).

As the method for detecting the maximal points of the signal AY(x,y;s), consideration may be given to various methods such as the detection of the points where the differential value of the signal AY(x,y;s) becomes 0.

In the encoding apparatus 10 of the first embodiment, the following method is adopted for example as a simple method for detection of the maximal points of the signal AY(x,y;s).

First, the difference between neighborhood samples in the x-axial direction of the signal AY(x,y;s) is calculated and the point where the sign of the difference changes from positive to negative is detected as the maximal point.

In the same way, the difference between neighborhood samples in the y-axial direction of the signal AY(x,y;s) is calculated and the point where the sign of the difference changes from positive to negative is detected as the maximal point.

The positional information PY(x,y;s) of the maximal point found in this way is the signal of the format shown in the following equation:

$$-PY(x,y;s) = \begin{cases} 1: & \text{when}(x,y) \text{ of } AY(x,y;s) \\ & \text{is characteristic point} \\ 0: & \text{when}(x,y) \text{ of } AY(x,y;s) \\ & \text{is not characteristic point} \end{cases} \quad (31)$$

The line data calculation unit 207 connects the maximal points based on the signal AY(x,y;s) found at the characteristic point detection unit 206 based on the positional information PY(x,y;s) of the maximal points, calculates the line data LY(k;s), and inputs this to the computation circuit 104 and the data extraction unit 205.

Below, an explanation will be made of the line data LY(k;s) calculation processing at the line data calculation unit 207 referring to FIG. 3 to FIG. 6.

Figure 4:
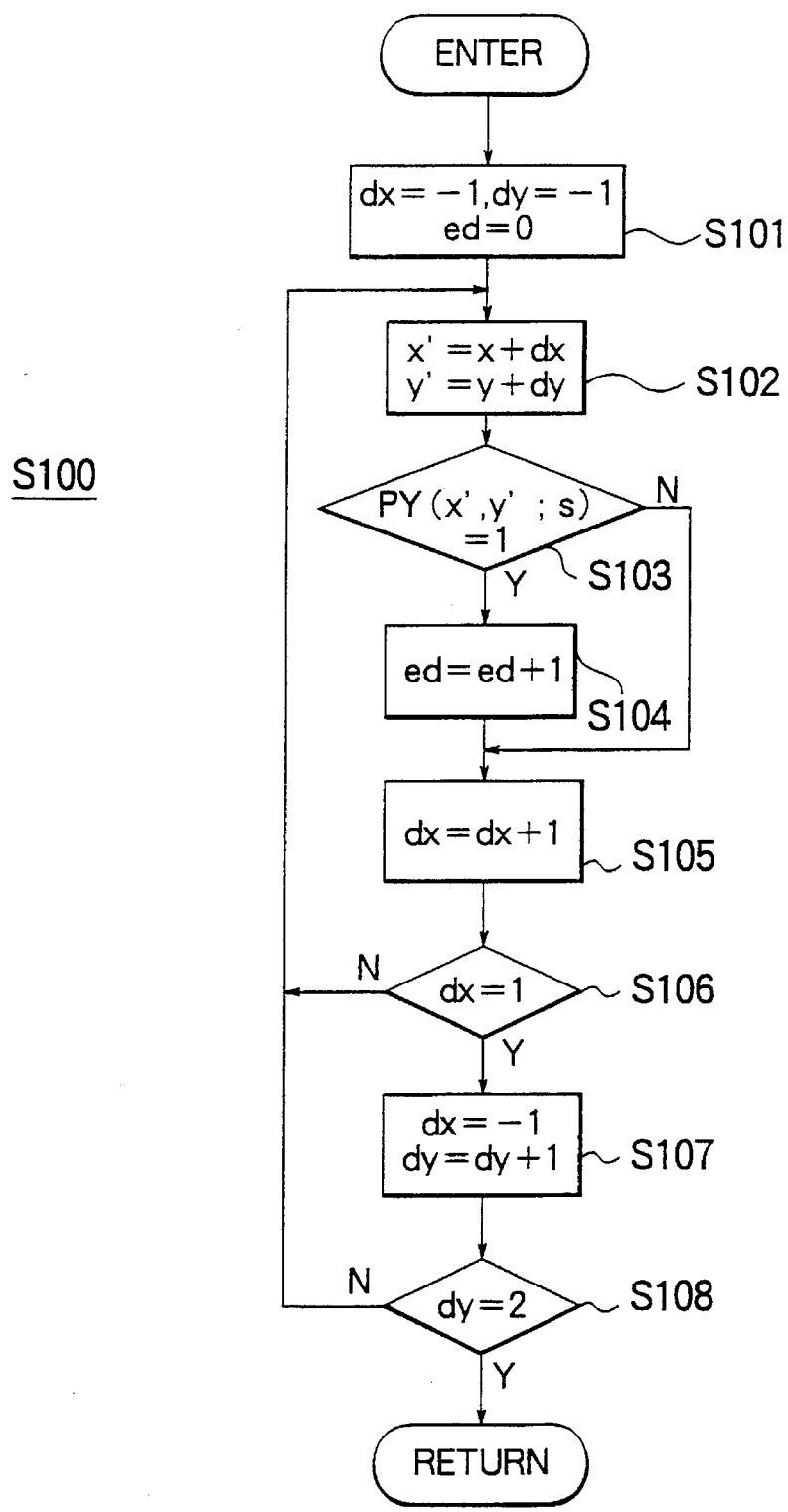
FIG. 4 is a flow chart of the processing of S100 shown in FIG. 3.
Figure 5:
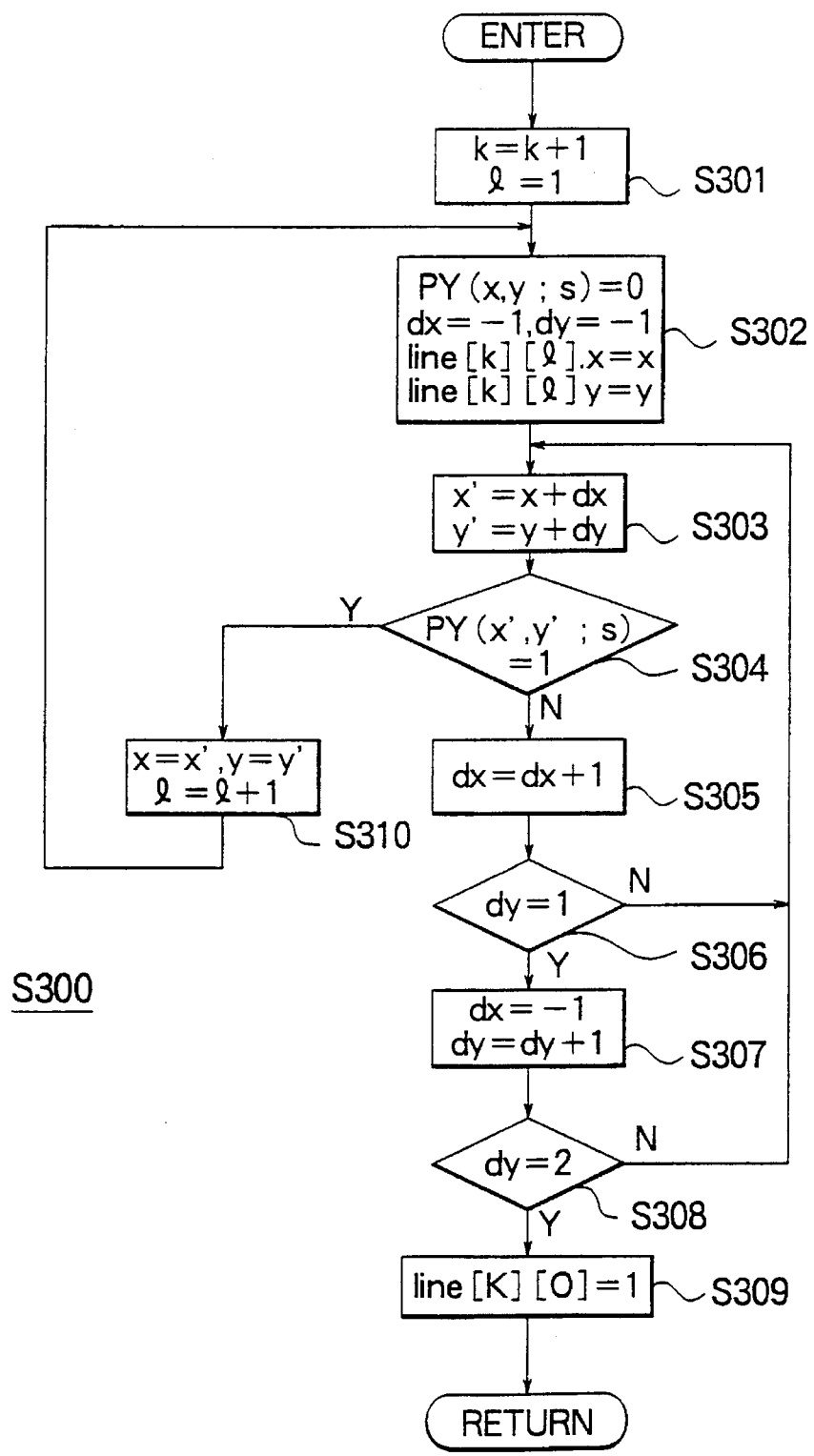
FIG. 5 is a flow chart of the processing of S300 shown in FIG. 3.
Figure 6:
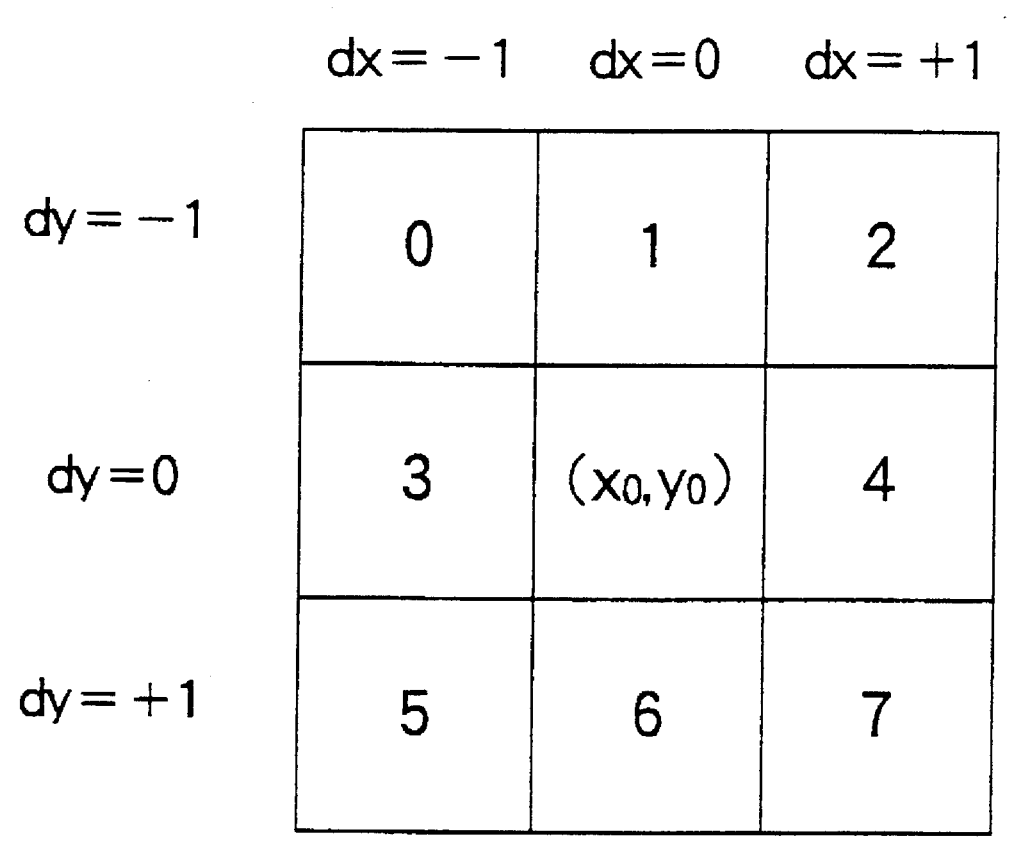

FIG. 3 is a flow chart of the processing for connection of the characteristic points at the line data calculation unit 207 shown in FIG. 2. FIG. 4 is a flow chart of the processing of S100 shown in FIG. 3. FIG. 5 is a flow chart of the processing of S300 shown in FIG. 3. FIG. 6 is a view explaining neighborhood pixels of image data.

First, the pixels where the signal PY(x,y;s) is 1 are successively sought to the right of the pixel with coordinates (x,y) of (0,0) at the top left corner in the signal PY(x,y;s) and a check is made if those pixels are end points.

That is, as shown in FIG. 6, consider the eight pixels 0 to 7 adjoining a center pixel where the signal PY(x,y;s)=1.

An end point is defined as a center pixel in the case where the signal PY(x,y;s) is 1 for one or less pixels in the pixels 0 to 7 shown in FIG. 6.

The line data calculation unit 207 detects the end points from the signal PY(x,y;s) in accordance with the above definition.

Note that the line data calculation unit 207 detects the end point making PY(x,y;s)=0 for the pixels sticking out of the picture in image data of an end of a picture.

The x-coordinate and the y-coordinate of the coordinates (x,y) of a pixel detected as an end point are respectively stored in the storage regions of the characteristic point detection unit 206 called the line [k][1].x and line [k][1].y (not shown).

The signal PY(x,y;s) at the coordinates (x,y) of an end point stored in the storage regions line [k][1].x and line [k][1].y is set to 0 and this is removed from the candidates for connection in the subsequent end point detection processing.

Here, the numerical value k is a number corresponding to the number of the line. The numerical value 1 is a natural number given as 1, 2 . . . in order to the connected points.

Note that as mentioned later, the number of points connected as the k-th line is stored in the storage region line [k][1].x.

After an end point is found, the coordinates (x',y') of one pixel in the pixels 0 to 7 of FIG. 6 are considered and the point where the signal PY(x',y';s)=1 which was first found is connected.

At that time, by setting PY(x',y';s) at the connected point to 0, this is removed from the candidates for connection in the subsequent end point detection processing.

Further, 1 is incremented (1=1+1), the line [k][1].x is made x', the line [k][1].y is made y', and the characteristic point is recorded as the first point of the k-th line data.

The above processing is performed for all pixels in the image data and is continued until there are no longer any characteristic points at the pixels 0 to 7 of FIG. 6.

Finally, the number of connected points is stored at line [k][1] and the number of the lines in the scale s is stored at the line [0][0].x.

The data stored in the line [k][1].x and line [k][1].y is output as the line data LY(k;s) in the format of the following table, for example, in the order of the smallest scale first.

TABLE 1 line [0][0].x (number of lines = k(s))
line [1][0].x (number of points constituting the first line)
line [1][1].x, line [1][1].y ((x,y) coordinates of first point of first line)
line [1][2].x, line [1][2].y ((x,y) coordinates of second point of first line)
.
.
.
line [2][0].x (number of points for constituting second line)
line [k][1].x, line [k][1].y ((x,y) coordinates of first point of second line)
.
.
.

The data extraction unit 205 extracts from the signal AY(x,y;s) the values corresponding to the characteristic points shown by the line data LY(k;s) input from the line data calculation unit 207 based on the line data LY(k;s) and outputs them as the signal Am(k;s).

An explanation will next be made of the processing at the data extraction unit 205.

The data extraction unit 205 uses the signal AY(x,y;s) and the line data LY(k;s) to extract the signal AY(x,y;s) at the positions of the characteristic points, that is, the necessary data, in the signal AY(x,y;s).

If the analysis values of the signal Y0(x,y) are traced along the lines detected by the line data calculation unit 207, a one-dimensional signal is obtained.

The one-dimensional signal is called the signal AmY'(k; s ).

In the later mentioned decoding apparatus 30, the operations shown in equation 29 and equation 30 are performed to reconstruct the impulse response W1Y(x,y;s) and the impulse response W2Y(x,y;s).

The phase data signal PhY(x,y;s) used at this time may be approximated by the cos and sine components of the angle of the tangential direction of the line data LY(k;s).

In this approximation, a tangent vector is assumed in the forward direction of the connected points and the angle constituted by that vector and the unit vector in the positive direction of the x-axis can be determined by the interval [0,2]).

Here, [or] shows a closed interval and (or) shows an open interval.

However, when approximating the signal PhY(x,y;s), it is supposed that a tangent vector in a direction opposite to the above for the line data LY(k;s) sometimes closely resembles equation 29 and equation 30.

If this direction is determined to be always the forward direction or reverse direction at one line, then the starting point and the end point may be switched so that the direction of connection of the line matches with the signal PhY(x,y;s).

However, a problem may occur of the direction changing midstream.

Accordingly, this problem is dealt with by considering the direction of the tangent vector to be the forward direction at all times, making the angle with the x-axis the signal PhY(x,y;s), adding 1 bit to the amplitude data signal AmY(x, y;s), and enabling the value of the signal AmY(x,y;s) to be either positive or negative.

The amplitude data including the plus/minus information is defined as the signal AmY(k;s).

Accordingly, a minus value is also included as the amplitude data in the signal AmY(k;s).

An explanation will now be made of the processing of the data extraction unit 205 referring to FIG. 3 to FIG. 5.

In FIG. 3, at step 01 (S01), the numerical value k is cleared to 0.

At step 02 (S02), the coordinates of the pixels of the image data are made (x,y)=(0,0).

At step 03 (S03), it is decided if the value of the signal PY (x,y;s ) is 1.

If the PY(x,y;s) is 1, the routine proceeds to the processing of S100 shown in FIG. 4. If not 1 (if 0), the routine proceeds to the processing of S04.

At step 04 (S04), the value of x is incremented (x=x+1).

At step 05 (S05), it is decided if the value of x is the maximum value X of the X-axis of the image data.

If the value of x is X, the routine proceeds to the processing of S03. If not X, the routine proceeds to the processing of S06.

At step 06 (S06), the value of x is cleared to 0 (x=0) and the value of y is incremented (y=y+1).

At step 07 (S07), it is decided if the value of y is the maximum value Y of the y-axis of the image data.

If the value y is Y, the routine proceeds to the processing of S03. If not Y, it proceeds to the processing of S07.

At step 200 (S200), the value of the processing of S100, that is, the numerical value ed, is decided.

If the numerical value ed is not more than 2, the routine proceeds to S300. If more than 2, it proceeds to the processing of S04.

In FIG. 4 at step 101 (S101), the numerical values dx, dy are set to −1 and the numerical value ed is cleared to 0.

Here, the numerical values dx, dy show the pixels 0 to 7 adjacent to a center pixel shown in FIG. 6. For example, if dx=−1 and dy=−1, the pixel 0 of FIG. 6 is shown.

Further, the numerical value ed shows the number of times that the signal PY(x,y;s) of a pixel subjected to processing is detected as being 1.

At step 102 (S102), the operations of x'=x+dx,y' and y'=y+dy are performed.

At step 103 (S103), it is decided if the signal PY(x,y;s) is 1.

If the PY(x,y;s) is 1, the routine proceeds to the processing of S104. If not 1 (if 0), the routine proceeds to the processing of S105.

At step 104 (S104), the numerical value ed is incremented (ed=ed+1).

At step 105 (S105), dx is incremented. At step 106 (S106), it is decided if dx is 1. If it is 1, the routine proceeds to step 107. If it is not 1, the routine proceeds to step 102.

At step 107 (S107), dx is set to −1 and dy is incremented (dy=dy+1).

At step 108 (S108), it is decided if dy is 2 or not.

If 2, the routine proceeds to the processing of S102. If not 2, the routine proceeds to the processing of S200 in FIG. 3.

In FIG. 5, at step 301 (S301), the numerical value k is incremented (k=k+1) and the numerical value 1 is set to 0.

At step 302 (S302), the signal PY(x,y;s) of the pixel subjected to the processing is set to 0, dx, dy are set to −1, x is set in the storage region line[k][1].x, and y is set in the storage region line[k][1].y.

At step 303 (S303), the operation of x'=x+dx,y'=y+dy is performed.

At step 304 (S304), it is decided if the signal PY(x,y;s) is 1 or not.

If the PY(x,y;s) is 1, the routine proceeds to the processing of S310. If not 1 (if 0), it proceeds to the processing of S305.

At step 305 (S305), dx is incremented (dx=dx+1).

At step 306 (S306), it is decided if dy is 1.

If the dy is 1, the routine proceeds to S307. If not 1 (if 0), it proceeds to the processing of S303.

At step 307 (S307), dxis set to −1 and dy is incremented (dy=dy+1).

At step 308 (S308), it is decided if dy is 2 or not.

If the dy is 2, the routine proceeds to the processing of S309. If not 2, it proceeds to the processing of S303.

At step 309 (S309), 1 is set in the storage region line[k][0].

At step 310 (S310), x' is set for x, y' is set for y, and the numerical value 1 is incremented (1=1+1).

The explanation will now be made referring once again to FIG. 2.

The signal analysis units 102 and 103 have similar configurations to the signal analysis unit 101.

The point of difference of the signal analysis unit 101 and the signal analysis units 102 and 103 is that the signal analysis units 102 and 103 do not have portions corresponding to the characteristic point detection unit 206 and the line data calculation unit 206.

In the signal analysis units 102 and 103, the processing is performed using the positional information of the characteristic points included in the line data LY(k;s) produced by the signal analysis unit 101.

The low frequency component processing unit 213 performs the same operation as the low frequency component processing unit 203.

That is, the low frequency component processing unit 213 performs on the chrominance signal U(x,y) similar processing as the processing performed by the low frequency component processing unit 203 of the signal analysis unit 101 on the luminance signal Y(x,y).

That is, the low frequency component processing unit 213 separates the low frequency component of the chrominance signal U(x,y) and outputs the result as the signal UL(x,y), subtracts the signal UL(x,y) from the chrominance signal U(x,y), and inputs the result as the signal U0(x,y) to the filters 211 and 212.

The filters 211 and 212 are a filter bank having the same impulse response characteristics as the filters 201 and 202.

The filter 211 performs similar processing on the signal U0(x,y) as the processing performed by the filter 201 of the encoding apparatus 10 on the signal Y0(x,y).

That is, it performs the computation shown in equation 18 on the signal U0(x,y) input from the low frequency component processing unit 213 to calculate the impulse response W1U(x,y;s) and inputs this to the computation circuit 214.

The filter 212 performs similar processing on the signal U0(x,y) as the processing performed by the filter 202 of the encoding apparatus 10 on the signal Y0(x,y).

That is, it performs the computation shown in equation 19 on the signal U0 (x,y) input from the low frequency component processing unit 213 to calculate the impulse response W1U(x,y;s) and inputs this to the computation circuit 214.

The computation circuit 214 performs similar processing on the input response W1U(x,y;s) and the impulse response W1U(x,y;s) input from the filters 211 and 212 as performed by the computation circuit 204 of the encoding apparatus 10 on the impulse response W1Y(x,y;s) and the impulse response W2Y(x,y;s).

That is, it squares and adds the impulse response W1U(x,y;S) and the impulse response WiU(x,y;s), calculates the square root of the results of the addition, and inputs this as the signal AU(x,y;s) to the data extraction unit 215.

The data extraction unit 215 performs similar processing on the signal AU(x,y;S) as the processing performed on the data extraction unit 205 on the signal AY(x,y;s) based on the line data LY(k;s).

That is, it extracts from the signal AU(x,y;S) the points corresponding to the characteristic points based on the line data LY(k;s) input from the signal analysis unit 101 and outputs the result as the signal AmU(k;s).

Below, the processing at the signal analysis unit 102 will be defined by numerical equations.

$$UL(x,y)=Wo(x,y)**U(x,y) \tag{32}$$

$$UO(x,y)=U(x,y)-UL(x,y) \tag{33}$$

$$W1U(x,y;s)=W1(x,y;s)**UO(x,y) \tag{34}$$

$$W2U(x,y;s)=W2(x,y;s)**UO(x,y) \tag{35}$$

$$AU(x,y;s)=[W1U(x,y;s)^2+W2U(x,y;s)^2]^{1/2} \tag{36}$$

Here, the signal AmU(k;s) is a one-dimensional signal of the signal AU(x,y;s) obtained by tracing along the line data LY(k;s) giving the characteristic points.

The processing at the signal analysis unit 103 is the same as the processing at the signal analysis unit 102.

The low frequency component processing unit 223 performs similar processing on the chrominance signal V(x,y) as the low frequency component processing unit 203 of the signal analysis unit 101 performs on the luminance signal Y (x, y).

That is, the low frequency component processing unit 223 separates the low frequency component of the chrominance signal V(x,y) and outputs it as the signal VL(x,y), subtracts the signal VL(x,y) from the chrominance signal V(x,y), and inputs the result as the signal V0(x,y) to the filters 221 and 222.

The filter 221 performs similar processing on the signal V0(x,y) as the processing performed by the filter 201 of the encoding apparatus 10 on the signal Y0(x,y).

That is, it performs the computation shown in equation 18 on the signal V0(x,y) input from the low frequency component processing unit 223 to calculate the impulse response W1V(x,y;s) and inputs this to the computation circuit 224.

The filter 222 performs similar processing on the signal V0(x,y) as the processing performed by the filter 202 of the encoding apparatus 10 on the signal Y0(x,y).

That is, it performs the computation shown in equation 19 on the signal V0(x,y) input from the low frequency component processing unit 223 to calculate the impulse response W1V(x,y;s) and inputs this to the computation circuit 224.

The computation circuit 224 performs similar processing on the input response W1V(x,y;s) and the impulse response W1V(x,y;s) input from the filters 221 and 222 as performed by the computation circuit 204 of the encoding apparatus 10 on the impulse response W1Y(x,y;s) and the impulse response W2Y(x,y;s).

That is, it squares and adds the impulse response W1V(x,y;s) and the impulse response W1V(x,y;s), calculates the square root of the results of the addition, and inputs this as the signal AV(x,y;s) to the data extraction unit 225.

The data extraction unit 225 performs similar processing on the signal AV(x,y;s) as the processing performed on the data extraction unit 205 on the signal AY(x,y;s) based on the line data LY(k;s).

That is, it extracts from the signal AV(x,y;s) the points corresponding to the characteristic points based on the line data LY(k;s) input from the signal analysis unit 101 and outputs the same as the signal AmV(k;s).

Below, the processing at the signal analysis unit 103 will be defined by numerical equations.

$$VL(x,y)=WO(x,y)**V(x,y) \tag{37}$$

$$VO(x,y)=V(x,y)-VL(x,y) \tag{38}$$

$$W1V(x,y;s)=W1(X,y;s)**VO(x,y) \tag{39}$$

$$W2V(x,y;s)=W2(x,y;s)**VO(x,y) \tag{40}$$

$$AV(x,y;s)=[W1V(x,y;s)^2+W2V(x,y;s)^2]^{1/2} \tag{41}$$

Here, the signal AmV(k;s) is a one-dimensional signal of the signal AVO(x,y;s) obtained by tracing along the line data LY(k;s) giving the characteristic points.

Below, an explanation will be given of the encoding apparatus 10 referring again to FIG. 1.

Here, assume that the input luminance signal Y(x,y) and chrominance signals U(x,y) and V(x,y) have the same intensity.

Normally, the ratio of intensity of the signals Y(x,y), U(x,y), and V(x,y) is 4:2:2 or so, but before input into the encoding apparatus 10, color moving picture data is often subjected to suitable interpolation or thinning or other transformation. When such transformation is performed, it is possible to consider the intensities of the signal to be substantially the same.

The signal analysis unit 101 analyzes the component Y0(x,y) obtained by removing the low frequency component from the luminance signal Y(x,y) using filters having several resolution scales s.

The signal analysis unit 101 further detects the characteristic points from the results of analysis of the scales, connects the positions of the characteristic points detected, and produces the line data LY(k;s).

Based on the line data LY(k;s), it extracts the values of the results of analysis of the positions of the characteristic points of the line data LY(k;s) and produces the signal AmY(k;s).

The line data LY(k;s) is input to the computation circuit 104, the signal analysis unit 102, and the signal analysis unit 103.

The signal AmY(k;s) is input to the analysis result compression unit 105.

The signal analysis unit 102 analyzes the signal U0(x,y) obtained by removing the low frequency component from the chrominance signal U(x,y) using filters with several resolution scales s and extracts the signal AmU(k;s) corresponding to the characteristic points based on the line data Y(k;s).

The signal AmU(k;s) is input to the analysis result compression unit 106.

The signal analysis unit 103 analyzes the signal V0(x,y) obtained by removing the low frequency component from the chrominance signal V(x,y) using filters with several resolution scales s and extracts the signal AmV(k;s) corresponding to the characteristic points based on the line data Y(k;s).

The signal AmV(k;s) is input to the analysis result compression unit 107.

The computation circuit 104 compresses the line data LY(k;s) by the method of chain encoding etc. and outputs the result as the signal CLY(k;s).

The analysis result compression units 105 to 107 compress the signal AmY(k;s), signal AmU(k;s), and signal AmV(k;s) by predictive encoding etc., produce the analysis results CAmY(k;s), analysis results CAmU(k;s), and analysis results CAmV(k;s), and input them to the modulation unit 109.

On the other hand, the signal analysis units 101 to 103 produce the low frequency component YL(x,y), the low frequency component UL(x,y), and the low frequency component VL(x,y) of the luminance signal Y(x,y), the chrominance signal U(x,y), and the chrominance signal V(x,y) and input them to the low frequency component compression unit 108.

The low frequency component compression unit 108 performs thinning processing etc. on the low frequency component YL(x,y), the low frequency component UL(x,y), and the low frequency component VL(x,y) and performs DCT (discrete cosine transformation) and wavelet transformation or other transform encoding for compression and inputs the results as the signal CLOW to the modulation unit 109.

The modulation unit 109 multiplexes the signal CLY(k;s), the analysis result CAmY(k;s), the analysis result CAmU(k;s), the analysis result CAmV(k;s), and the signal CLOW, adds an error correction code etc., and modulates the same to produce the signal CData and inputs the same to the transmission medium connected to the encoding apparatus 10.

The encoding apparatus 10 of the first embodiment is constituted so as to detect the characteristic points based on the luminance signal Y(x,y), but the characteristic points may be also detected based on the chrominance signal U(x,y) or the chrominance signal V(x,y).

The portions of the encoding apparatus 10, further, may be comprised of respectively independent pieces of hardware or all or part may be realized in a computer by software.

Further, an apparatus of a similar configuration to the encoding apparatus 10 may perform similar processing on the color signals (R, G, B) corresponding to the three prime colors of light, not just on the luminance signal Y(x,y) and the chrominance signals U(x,y) and V(x,y).

Next, an explanation will be made referring to FIGS. 7 to 11 of a decoding apparatus 30, as a second embodiment, for decoding image data encoded by the encoding apparatus 10 shown as the first embodiment.

An explanation will first be made of the configuration of the decoding apparatus 30 referring to FIGS. 7 to 10.

Figure 7:
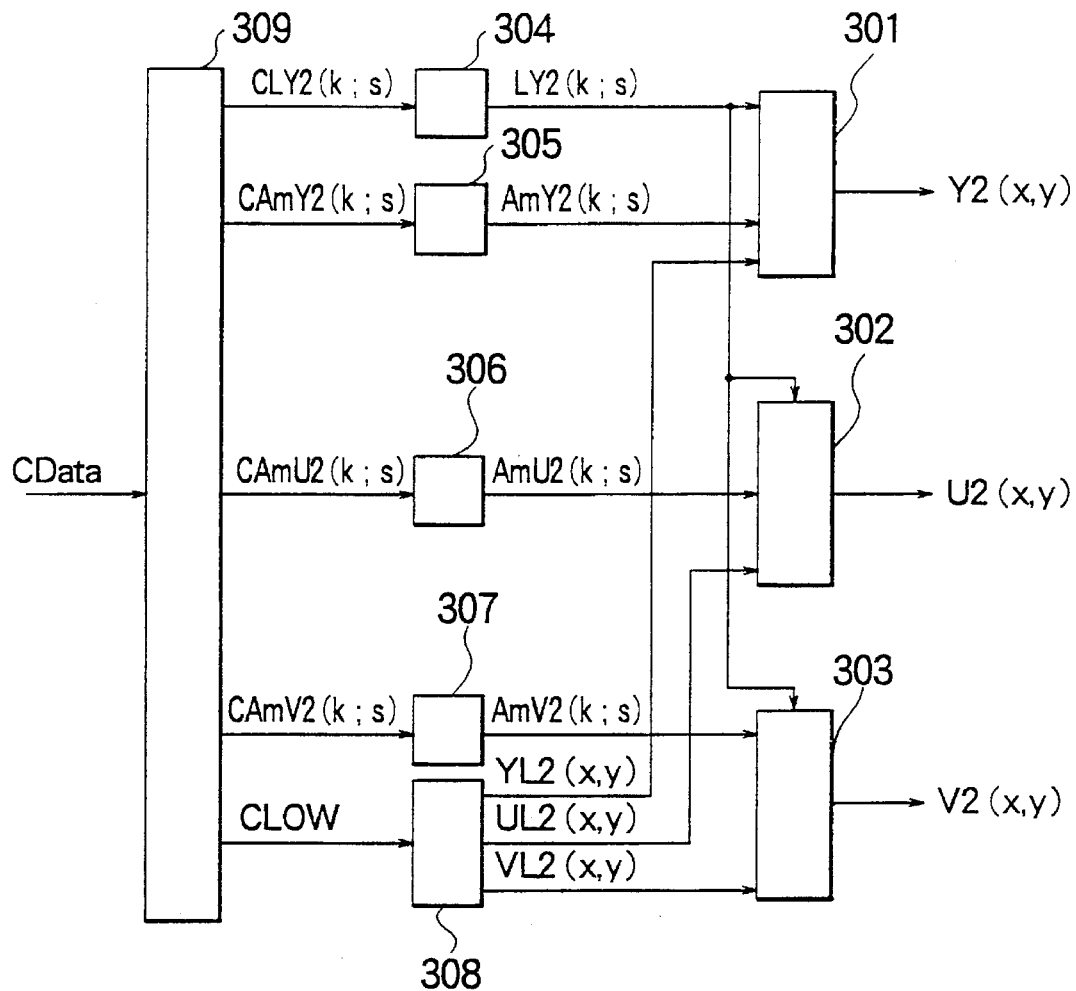
FIG. 7 is a view of the configuration of a decoding apparatus of a second embodiment of the present invention.

FIG. 7 is a view of the configuration of the decoding apparatus 30 of the present invention.

As will be understood from a comparison of FIG. 7 and FIG. 1, the decoding apparatus 30 is configured to give signal processing and a signal flow reverse to those of the encoding apparatus 10 shown in the first embodiment.

In FIG. 7, the demodulation unit 309 modulates the encoded signal encoded by the encoding apparatus 10 for example and then recorded or sent in, performs error correction, separates it to the signal CLY2(k;s), signal AmY2(k;s), signal AmU2(k;s), signal AmV2(k;s), and signal CLOW, and inputs the same to the computation circuit 304, the expansion units 305 to 307, and the low frequency component expansion unit 308.

Here, the signal CLY2(k;s), signal AmY2(k;s), signal AmU2(k;s), signal AmV2(k;s), and signal CLOW correspond to the signal CLY(k;s), signal AmY(k;s), signal AmU(k;s), signal AmV(k;s), and signal CLOW shown in FIG. 1.

The signals shown in FIG. 7 are indicated by the names of the signals shown in FIG. 1 plus the number 2. In so far as no uncorrectable error occurs in the decoding apparatus 309 on the recording medium or the transmission path between the encoding apparatus 10 and the decoding apparatus 30, the corresponding signal and range of transformation error and quantization error are the same.

The low frequency component expansion unit 308 performs reverse transformation as the low frequency component compression unit 108 of the encoding apparatus 10 on the received encoded signal so as to expand the same and obtain the two-dimensional signal.

That is, a signal corresponding to the left side of equations 15 to 17 is obtained.

Further, interpolation is performed reverse to the thinning performed at the low frequency component compression unit 108.

This interpolation processing is shown for example by the following equation:

$$YL2'(x,y) = YL'([x/2^s], [y/2^s]) \quad (42)$$

$$UL2'(x,y) = UL'([x/2^s], [y/2^s]) \quad (43)$$

$$VL2'(x,y) = VL'([x/2^s], [y/2^s]) \quad (44)$$

$$YL2(x,y) = L0(x,y) ** YL2'(x,y) \quad (45)$$

$$UL2(x,y) = L0(x,y) ** UL2'(x,y) \quad (46)$$

$$VL2(x,y) = L0(x,y) ** VL2'(x,y) \quad (47)$$

Here, $x=0, \ldots X-1$, $y=0, \ldots, Y-1$ and $[x/2^s]$ shows an integer obtained by discarding the portion below the decimal point of the numerical value $x/2^s$.

Further, $L0(x,y)$ is the impulse response of a suitable low pass filter.

The signal YL2(k;s), signal UL2(k;s), and signal VL2(k;s) produced by the low frequency component expansion unit 308 are input to the signal inverse transformation units 301 to 303, respectively.

The computation circuit 304 processes the compressed line data signal CLY(k;s) and finds the line data LY2(k;s) of the characteristic points corresponding to the line data LY(k;s) in the encoding apparatus 10.

The processing at the computation circuit 304 corresponds to the inverse transformation of the processing of the computation circuit 104.

That is, the computation circuit 104 compresses the line data LY(k;s) to the 3-bit data array designating the coordinates of the line data LY(k;s) and one of the pixels 0 to 7 shown in FIG. 6, so reads the coordinates (x,y) of the starting point, then makes successive use of 3-bit units of the following signal array, advances the coordinates in the direction designated in FIG. 6, and thereby reconstructs the line data LY2(k;s).

The expansion units 305 to 307 perform the inverse transformation processing of the analysis result compression units 105 to 107, that is, the DPCM inverse transformation explained in the first embodiment.

The DPCM inverse transformation is realized by the accumulation of the differences to the values of the array one time before.

The signal array obtained by the DPCM inverse transformation is input as the signal AmY2(k;s), AmU2(k;s), and AmV2(k;s) to the signal inverse transformation units 301 to 303.

The signal inverse transformation unit 301 uses the line data LY2(k;s) and the signal AmY2(k;s) at the characteristic points included in the line data LY2(k;s) as the information on the positions of the characteristic points and uses the projection shading method to reconstruct the two-dimensional signal Y2(x,y) corresponding to the source luminance signal Y(x,y).

The processing of the signal inverse transformation unit 301 is similar to that of the signal inverse transformation units 302 and 303 for the chrominance signals U2(x,y) and V2(x,y).

A further explanation will now be made of the configuration and operation of the signal inverse transformation units 301 to 302 referring to FIGS. 8 to 11.

Figure 8:
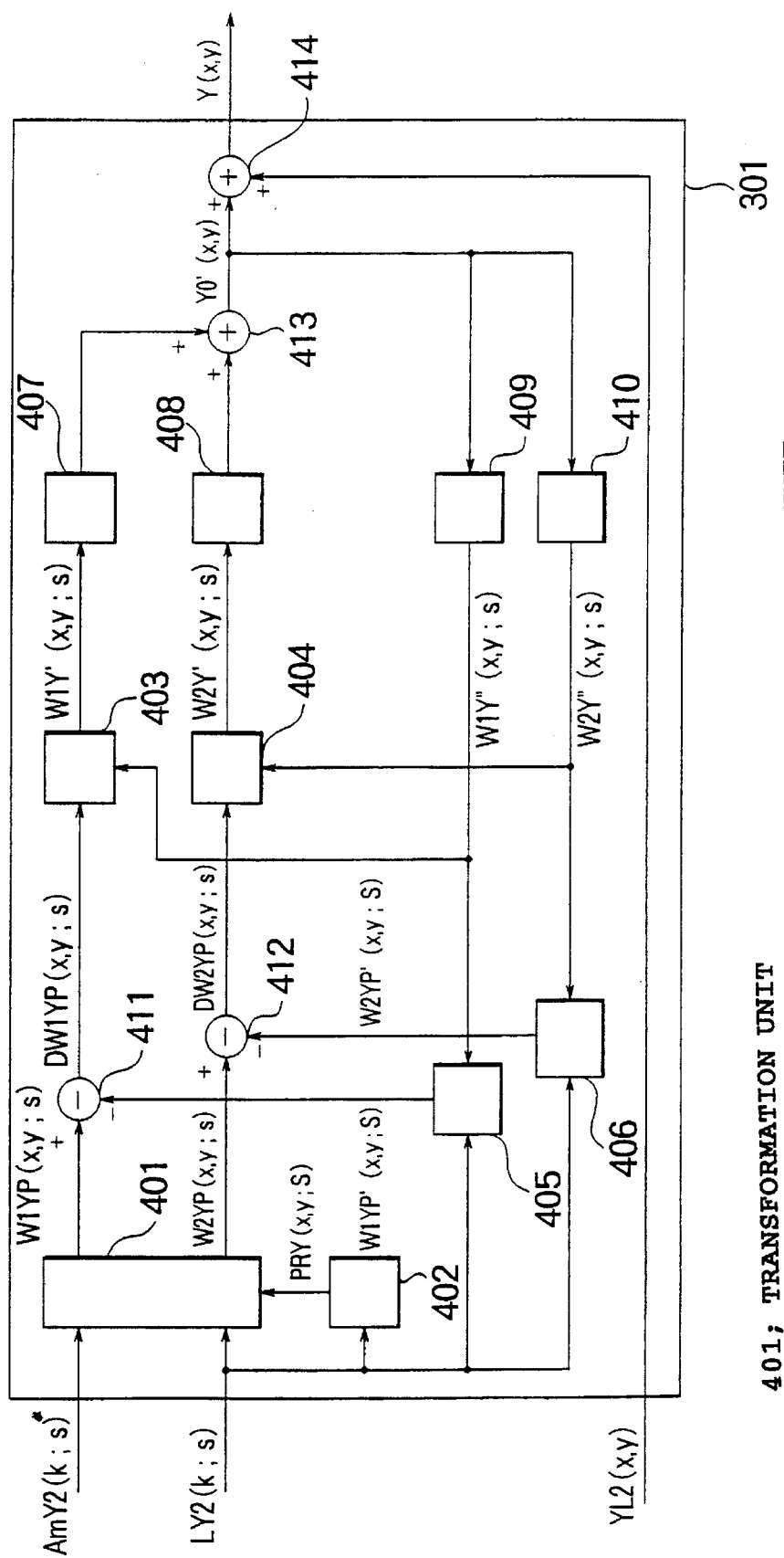
FIG. 8 is a view of the configuration of a first signal inverse transformation unit shown in FIG. 7.
Figure 9:
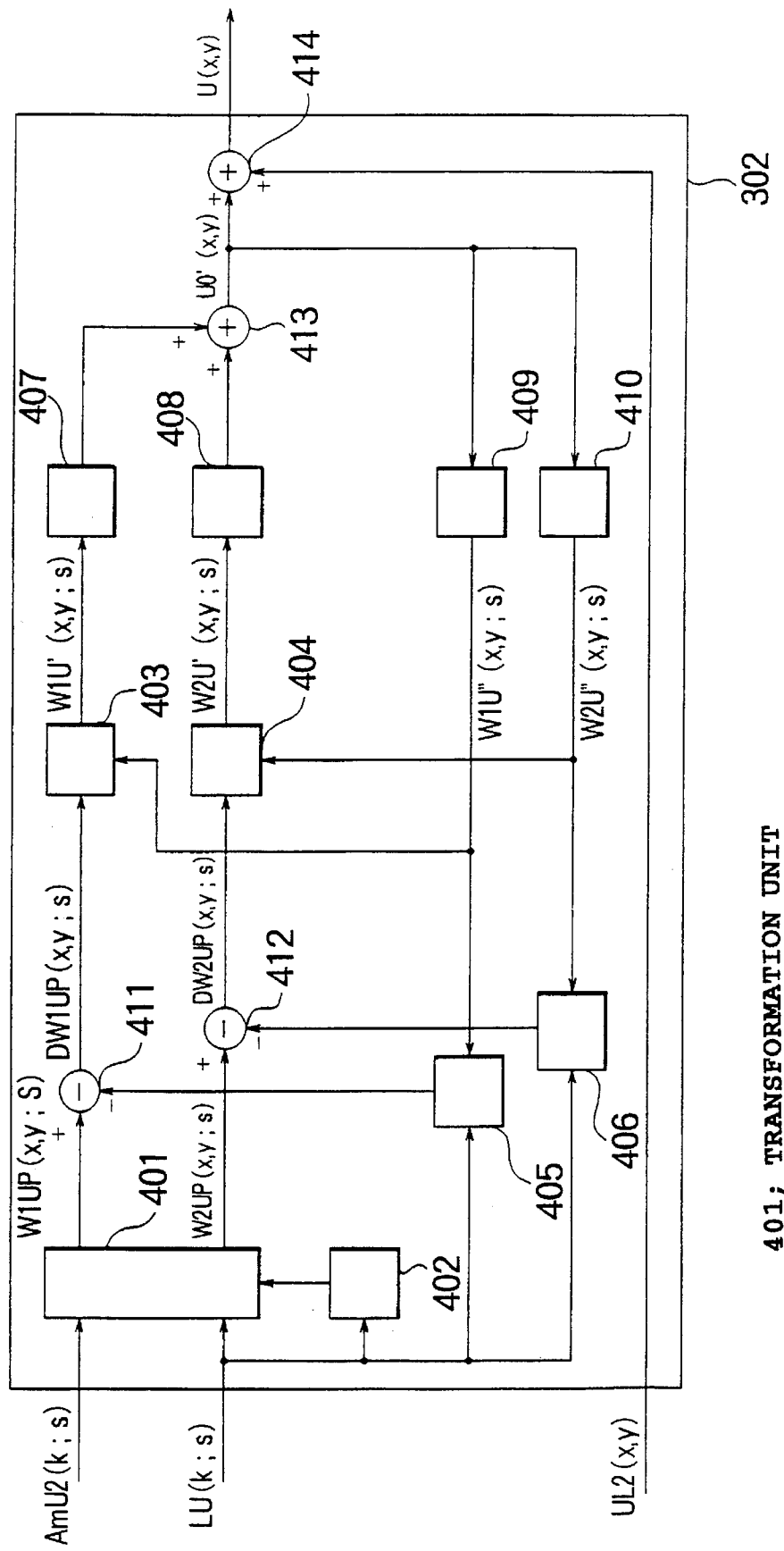
FIG. 9 is a view of the configuration of a second signal inverse transformation unit shown in FIG. 7.
Figure 10:
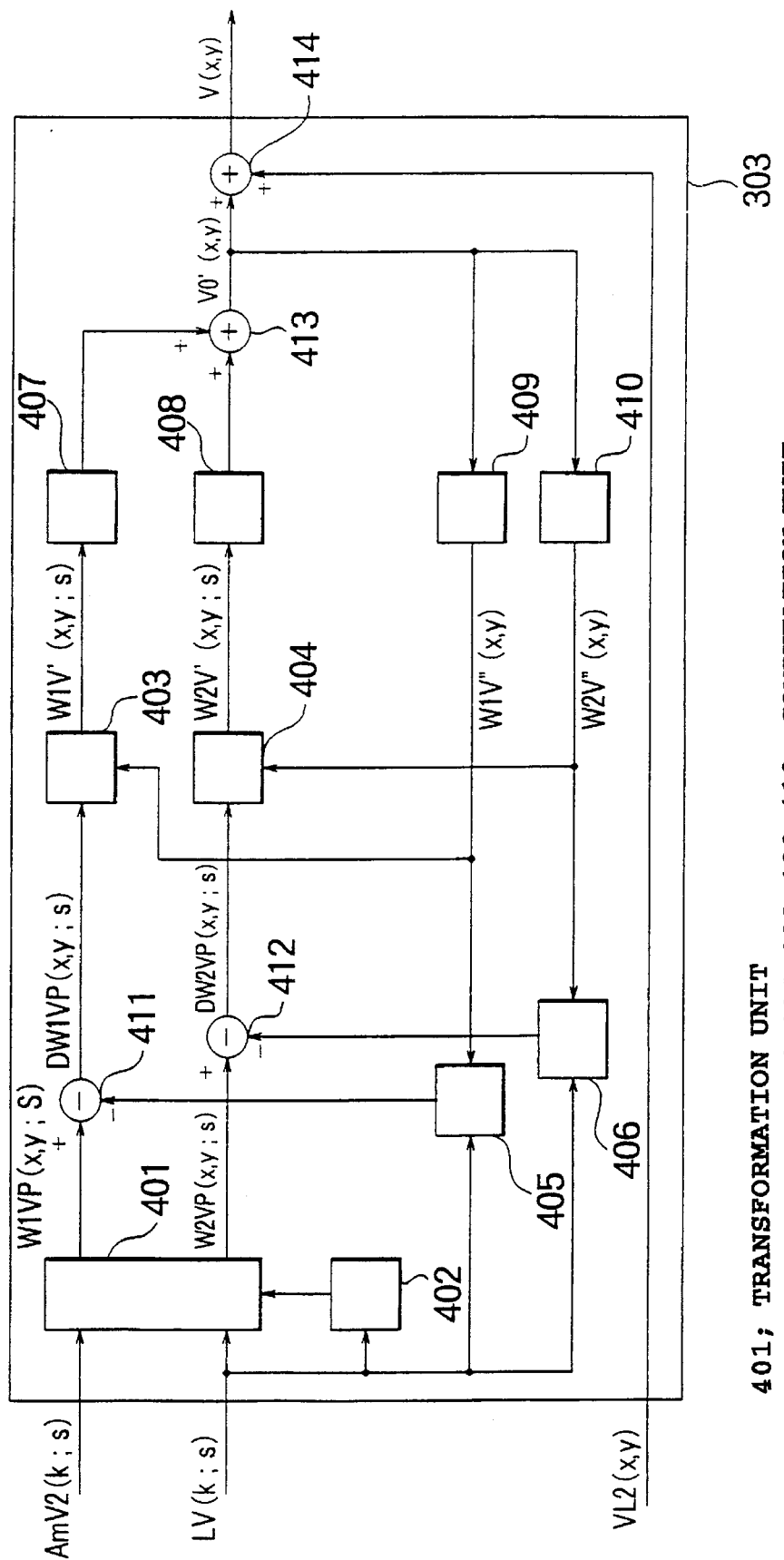
FIG. 10 is a view of the configuration of a third signal inverse transformation unit shown in FIG. 7.

FIG. 8 is a view of the configuration of a first signal inverse transformation unit 301 shown in FIG. 7. FIG. 9 is a view of the configuration of a second signal inverse transformation unit 302 shown in FIG. 7. FIG. 10 is a view of the configuration of a third signal inverse transformation unit 303 shown in FIG. 7.

The signal inverse transformation units 301 to 303 reproduce the luminance signal Y(x,y) in the encoding apparatus 10, the luminance signal Y2(x,y) corresponding to the chrominance signals U(x,y) and V(x,y), and the chrominance signals U2(x,y) and V2(x,y).

As will be understood with reference to FIGS. 8 to 10, the portions constituting the signal inverse transformation units 301 to 303 constitute processing loops. The processings at the signal inverse transformation units 301 to 303 are the same except that the input signals differ.

The Y, U, and V given to the signal parts of FIG. 8 to FIG. 10 indicate that the subjects of the processing are the luminance signal Y and chrominance signals U and V.

Next, an explanation will be given of only the signal inverse transformation unit 301.

The transformation unit 401 fits the corresponding signal AmY2(k;s) to the coordinates of the characteristic points designated by the line data LY2(k;s) to transform it to the two-dimensional data AY2P(x,y;s).

The two-dimensional data AY2P (x, y; s) has a significant value only at coordinates of characteristic points designated by the line data LY2(k;s) and is two-dimensional data of a value of 0 at other coordinates.

In the processing of the transformation unit 401, a signal PhY2(x,y) corresponding to the signal PhY(x,y) explained in the first embodiment as the phase data becomes necessary.

In the computation unit 402, the signal PhY2(x,y) is calculated after finding the tangential direction by the method explained below from the coordinate array (x,y) of the connected characteristic points included in the line data LY2(k;s).

In the encoding apparatus 10 of the first embodiment, the line data LY(k;s) is encoded using chain encoding, so the array (x,y) included in the LY2(k;s) is sampled in lattice points and it is hard to find the tangential direction.

Therefore, first, consider the array $(x_q, y_q)$ of the points of a line of a certain resolution scale s.

Here, the subscript q is an index given to points arranged in a certain order. q=1, . . . , Q(k).

Further, Q(k) shows the number of points included in the k-th line.

Below, an explanation will be made focusing on the line data LY2(k;s) corresponding to a specific line of characteristic points, so Q(k) is expressed as Q.

Here, the function px(t) will be defined.

The function px(t) is a function expressing $x_p$ and uses as a parameter the length t from the starting point of a certain array $(x_p)$ of connected characteristic points.

The length t is determined arbitrarily for the index q.

In the same way, the function py(t) is defined by the length t from the starting point of the array $(y_q)$ of connected characteristic points and the coordinates $y_q$.

The function px(q) and the function py(q) are filtered by a low pass filter having the characteristic of the function G0(t).

$$lpx(t)=px(t)*G0(t) \quad (48)$$

$$lpy(t)=py(t)*G0(t) \quad (49)$$

The functions lpx(t), lpy(t) give curves which are not affected by a lattice like sampling.

The functions lpx(t) and lpy(t) are differentiated once with respect to t to give dpx(t) and dpy(t).

In actuality, the function $G1(t)=\alpha G0(t)/\alpha_t$ obtained by one differentiation of the function G0(t) is found, convolution processing is performed on the function G1(t) of the following equation with the function px(q) and the function py(q), and filtering is performed.

$$dpx(t)=px(t)*G1(t) \quad (50)$$

$$dpy(t)=py(t)*G1(t) \quad (51)$$

The vector [dpx[t], dpy[t]] of the above equations becomes a tangent vector. Accordingly, the angle found from this line at the resolution scale s is expressed by the following equation:

$$PhY2(xq,yq;s)=\mathrm{atan}\,[dpy(t), dpx(t)] \quad (52)$$

As mentioned above, q and t are arbitrarily determined in a one-to-one correspondence.

These are found for all the lines and resolution scales.

The signal PY2(x,y;s)=0 is made the output of the computation unit 402 at coordinates other than the characteristic points.

The signal PhY2(x,y) is input to the transformation unit 401.

The transformation unit 401 uses the signal PhY2(x,y) and signal AY2(x,y;s) to find the impulse W2YP(x,y;s) and W2YP (x,y; s).

These operations are shown by the following equations:

$$W1PY(x,y;s)=AY2(x,y;s)\cos\,(PhY2(x,y;s)) \quad (53)$$

$$W2YP(x,y;s)=AY2(x,y;s)\sin\,(PhY2(x,y;s)) \quad (54)$$

On the other hand, the computation units 409 and 410 set and output W1YP"(x,y;s)=W1YP'(x,y;s)=0 in the initial state.

The signal W1YP"(x,y;s) and W1YP'(x,y;s) are input to the computation units 405 and 406. The computation units 405 and 406 sample only the values of the signal W1YP"(x,y;s) and W1YP'(x,y;s) corresponding to the characteristic points contained in the line data LY2(k;s) and output the same as the signal W1YP'(x,y;s) and W2YP'(x,y;s).

That is, the computations of the following equations are performed:

$$W1YP'(x,y;s) = \begin{cases} W1Y''(x,y;s); \text{ point given } (x,y) \text{ by } LY2(k;s) \\ 0; \text{ point not-given } (x,y) \text{ by } LY2(k;s) \end{cases} \quad (55)$$

$$W2YP'(x,y;s) = \begin{cases} W2Y''(x,y;s); \text{ point given } (x,y) \text{ by } LY2(x,y) \\ 0; \text{ point not-given } (x,y) \text{ by } LY2(x,y) \end{cases} \quad (56)$$

The signal W1YP'(x,y;s) and W2YP'(x,y;s) are subtracted from the output signals of the transformation unit 401 and computation unit 402 at the subtraction circuits 411 and 412 and the results are input as the signal DW1YP(x,y;s) and DW2YP(x,y;s) to the computation units 403 and 404.

$$DW1YP(x,y;s)=W1YP(x,y;s)-W1YP'(x,y;s) \quad (57)$$

$$DW2YP(x,y;s)=W2YP(x,y;s)-W2YP'(x,y;s) \quad (58)$$

Here, the signals DW1YP(x,y;s) and DW2YP(x,y;s) have significant values only at the characteristic points and are 0 at other points.

Accordingly, the computation units 403 and 404 perform interpolation processing on the signals DW1YP (x,y;s) and DW2YP (x,y;s).

Various methods may be considered for the interpolation, but here interpolation is performed using the function derived from the condition that the vibration be small.

First, for the signal DW1YP(x,y;s), since the maximal point of the partial differentiation in the x-direction is the minimal point, y is fixed and interpolation is performed in the x-direction.

Here, $x_i$ and $x_{(i+1)}$ are characteristic points which continue even with scanning in the x-direction.

Interpolation is performed by the function defined by:

$$e1=a\cdot\exp[k(s)(x-x_i)]+b\cdot\exp[-k(s)(x-x_i)] \quad (59)$$

Here, k(s) is a suitable positive number dependent on the resolution scale s. The unknown numbers a and b can be found by the two boundary conditions of the following equations:

$$e1(x_i)=DW2YP(x_i,y;s) \quad (60)$$

$$e1(x_{i+1})=DW2YP(x_{i+1},y;s) \quad (61)$$

The interpolation of the y-direction is performed in a similar way.

The interpolation function is made the function e2(y).

Next, the functions e1(x) and e2(y) are added to the outputs of the computation units 409 and 410.

That is, the function e1(x) of each interval is found by the following equation in the state with the s and y fixed.

$$W1Y'(x,y;s)=W1Y''(x,y;s)+e1(x) \quad (62)$$

In the same way, e2(y) is found in the state with s and x fixed. Considering that $$W2Y'(x,y;s)=W2Y''(x,y;s)+e2(x) \quad (63)$$

the signals W1Y'(x,y;s) and W2Y'(x,y;s) are input to the computation units 407 and 408.

The computation units 407 and 408 are filter-back inverse filters having characteristics given by equation 64 and equation 65.

If the inverse filter characteristics are made the functions IW1(x,y;s) and IW2(x,y;s) and the two-dimensional Fourier transformations relating to x and y are made FIW1(wx,wy;s) and FIW2(wx,wy;s), the inverse filters are given by the following equations in a Fourier space:

$$FIW1(wx,wy)=(1/C(wx,wy))FW1(wx,wy;s)^* \quad (64)$$

$$FIW2(wx,wy)=(1/C(wx,wy))FW2(wx,wy;s)^* \quad (65)$$

Here, FW1(wx,wy;s) and FW2(wx,wy;s) show the Fourier transformations of W1(x,y;s) and W2(x,y;s), while "*" shows a complex conjugation.

Further, the function C(wx,wy) is defined by the following equation:

$$C(wx,wy)=SUM_{(s=1,\ldots,s)} \quad (66)$$

Here, $SUM_{(s=1,\ldots,s)}$ in the above equation means the sum for all the resolution scales s.

The signal YY1(x,y;s) and YY2(x,y;s) are output through the filters defined by the following equations:

$$YY1(x,y;s)=IW1(x,y;s)^{**}W1Y(x,y;s) \quad (67)$$

$$YY2(x,y;s)=IW2(x,y;s)^{**}W2Y(x,y;s) \quad (68)$$

These signals YY1(x,y;s) and YY2(x,y;s) are added for all the resolution scales s to obtain the signal YO'(x,y).

$$YO'(x,y)=SUM_{(s+1,\ldots,s)}[YY1(x,y;s)+YY2(x,y;s)] \quad (69)$$

The signal YO'(x,y) is input to the computation units 409 and 410.

At the computation units 409 and 410, the same analyses are performed as in the filters 201 and 202 shown in FIG. 2.

$$W1Y''(x,y;s)=W1(x,y;s)^{**}YO'(x,y) \quad (70)$$

$$W2Y''(x,y;s)=W2(x,y;s)^{**}YO'(x,y) \quad (71)$$

This completes the processing loop.

At the first initial value, W1Y''(x,y;s)=W2Y''(x,y;s) =0, but this loop gives a suitable signal and the signal YO'(x,y) is obtained through the computation units 403 and 408.

The above processing is repeated until suitable conditions are satisfied.

In this example, for simplification of the configuration, the processing is repeated 10 times and then ended.

A low frequency component YL2(x,y) is added to the finally obtained signal YO'(x,y) to obtain the final luminance signal Y(x,y).

The same processing as the portions of the signal inverse transformation unit 301 is performed at the corresponding portions of the decoding apparatuses 302 and 303 for the chrominance signals U(x,y) and V(x,y).

An explanation will next be made of modifications of the image data encoding apparatus and decoding apparatus of the present invention described in the above embodiments.

In the decoding apparatus 30 of the second embodiment too, like with the encoding apparatus 10 of the first embodiment, it is possible to encode the moving picture data including the color signals R, G, and B as the color elements.

This is because moving picture data including the color signals R, G, and B as signal elements may also be considered to have characteristic points which have a close correspondence among signal elements or are in common like with the moving picture data including the luminance signal Y and chrominance signals U and V as signal elements.

In this case, it is possible to input into the encoding apparatus 10 the color signal G instead of the luminance signal Y, the color signal R instead of the chrominance signal U, and the color signal B instead of the chrominance signal V and to decode by the decoding apparatus 30 the encoded signal encoded by the encoding apparatus 10.

Further, at the encoding apparatus 10, it may be considered to find the line data LY(k;s) of the characteristic points based on the luminance signal Y and to encode and decode the color signals R, G, and B of the same picture using the line data LY(k;s).

Further, the characteristics of the filters 201 and 202 of the encoding apparatus 10 are not limited to ones of the format of one differentiation of the above Gaussian function. For example, use may be made of a tertiary B-spline etc. as the smoothing function.

Further, the number of samples of the moving picture signal subjected to the processing was made the same for the luminance signal Y and the chrominance signals U and V, but may be different as well.

In this case, by performing suitable thinning or interpolation on the signal and transforming the number of samples to complete the number of samples, it is possible to easily perform the encoding processing of the present invention.

Further, when the sample positions of the luminance signal Y and the chrominance signals U and V are deviated from each other, it is easy to make corrections and give accurate correspondence to the characteristic points.

Further, the number of samples and the sample points can be corrected not by input signal, but by the state of the line data.

That is, if the array of the line data LY(k;s) is converted to a parameter expression of the length t as performed in equation 48 and equation 49 and then the length is transformed and sampling again performed, it is possible to prepare a curve comprised of characteristic points similar to the line data LY(k;s) of the different magnitude.

Alternatively, if the functions 1px(t) and 1py(t) shown in equation 48 and equation 49 are multiplied by different constants, it is possible to prepare geometrically transformed curves with different longitudinal/lateral ratios.

Further, adding suitable values to the functions 1px(t) and 1py(t) is equivalent to shifting the sample points by those values.

It is possible to correct the number of samples and the sample points in this way in stages of the line data.

In the above embodiment, the encoding and decoding were performed using only the line data LY(k;s), that is, the data on the characteristic points of the luminance signal Y(x,y), but it is also possible to detect the characteristic points in the chrominance signals U and V and encode the characteristic points not present in the line data LY(k;s) so as to improve the picture quality.

Further, conversely, when there is a characteristic point in the luminance signal Y(x,y), but no characteristic points at corresponding positions in the chrominance signals U and V, the apparatuses may be configured to encode and decode data showing this fact.

Further, the decoding apparatus 30, like the encoding apparatus 10, may be configured as hardware or configured as software in a computer.

In addition to the configurations shown in the above embodiments, as shown by the above modifications etc., the image data encoding apparatus and decoding apparatus of the present invention can be of various configurations.

As explained above, the present invention provides an image data encoding apparatus and decoding apparatus, never before in existence, making positive use of the correlation among the plurality of signal elements contained in moving picture data for example.

According to the present invention, by making common use of all or part of the characteristic points of the plurality of signals constituting color moving picture data, it is possible to increase by an extremely high rate the compression efficiency of color moving picture data, possible to encode with a small amount of data, and possible to suitably decode the encoded signal.

What is claimed is:

1. An image data encoding apparatus comprising:

means receiving elements of a video signal for separating low frequency components therefrom so as to form relatively low frequency video signals and relatively high frequency video signals;

means for detecting characteristic points from said high frequency video signals and for generating line data based upon positions of said characteristic points;

means for extracting values from said high frequency video signals based on said line data;

means for compressing said line data, said low frequency video signals, and the extracted values so as to form compressed video signals; and means for modulating said compressed video signals.

2. An image data encoding apparatus according to claim 1, wherein said video signal is a color moving picture signal and wherein said elements include one of (i) a luminance signal and chrominance signals and (ii) red, green and blue (RGB) color signals.

3. An image data encoding apparatus according to claim 2, wherein said characteristic points correspond to edges of objects represented by said color moving picture signal.

4. An image data encoding apparatus according to claim 1, wherein the detecting means includes means for filtering said high frequency video signals.

5. An image data encoding apparatus according to claim 4, wherein the filtering means includes differential-type filters.

6. An image data encoding apparatus comprising:

means receiving a video signal having a luminance portion and first and second chrominance portions for separating low frequency components therefrom so as to respectively form relatively low and high frequency luminance signals, relatively low and high frequency first chrominance signals, and relatively low and high frequency second chrominance signals;

means for detecting characteristic points from one of said relatively high frequency luminance signal, said relatively high frequency first chrominance signal and said relatively high frequency second chrominance signal;

means for determining positions corresponding to the detected characteristic points and for generating line data based upon said positions;

first extracting means for extracting values from the one of said relatively high frequency luminance signal, said relatively high frequency first chrominance signal and said relatively high frequency second chrominance signal from which said characteristic points are detected based on said line data and for producing a first extracted signal therefrom;

second extracting means for extracting values corresponding to said characteristic points based on said line data from one of the two of said relatively high frequency luminance signal, said relatively high frequency first chrominance signal and said relatively high frequency second chrominance signal from which said characteristic points are not detected and for producing a second extracted signal therefrom;

third extracting means for extracting values corresponding to said characteristic points based on said line data from the other of the two of said relatively high frequency luminance signal, said relatively high frequency first chrominance signal and said relatively high frequency second chrominance signal from which said characteristic points are not detected and for producing a third extracted signal therefrom;

means for compressing said line data, said first extracted signal, said second extracted signal, said third extracted signal, said relatively low frequency luminance signals, said relatively low frequency first chrominance signals, and said relatively low frequency second chrominance signals so as to form compressed video signals; and means for modulating said compressed video signals.

7. An image data encoding apparatus according to claim 6, wherein said characteristic points correspond to edges of objects.

8. An image data decoding apparatus comprising:

demodulation means for demodulating received modulated compressed video signals so as to obtain signals corresponding to compressed line data, compressed low frequency video signals and compressed extracted values, in which said modulated compressed video signals are obtained by separating low frequency components from elements of a video signal so as to form relatively low frequency video signals and relatively high frequency video signals, detecting characteristic points from said high frequency video signals, generating line data based upon positions of said characteristic points, extracting values from said high frequency video signals based on said line data, compressing said line data, said low frequency video signals and the extracted values so as to respectively form said compressed line data, said compressed low frequency video signals and said compressed extracted values, and modulating said compressed line data, said compressed low frequency video signals and said compressed extracted values;

means for processing the signals corresponding to said compressed line data, said compressed low frequency video signals and said compressed extracted values; and means for transforming the processed line data, the processed low frequency video signals and the processed extracted values so as to form signals corresponding to said elements.

9. An image data decoding apparatus according to claim 8, wherein said video signal is a color moving picture signal and wherein said elements include one of (i) a luminance signal and chrominance signals and (ii) red, green and blue (RGB) color signals.

10. An image data decoding apparatus according to claim 8, wherein said characteristic points correspond to edges of objects represented by said color moving picture signal.

11. An image data processing system comprising:

an image data encoding apparatus having means receiving elements of a video signal for separating low frequency components therefrom so as to form relatively low frequency video signals and relatively high frequency video signals; means for detecting characteristic points from said high frequency video signals and for generating line data based upon positions of said characteristic points; means for extracting values from said high frequency video signals based on said line data; means for compressing said line data, said low frequency video signals, and the extracted values so as to respectively form compressed line data, compressed low frequency video signals and compressed extracted values, and modulating said compressed line data, said compressed low frequency video signals and said compressed extracted values compressed video signals; and means for modulating said compressed line data, said compressed low frequency video signals and said compressed extracted values; and an image data decoding apparatus having demodulation means for demodulating the modulated compressed line data, the modulated compressed low frequency video signals and the modulated compressed extracted values so as to obtain signals corresponding to said compressed line data, said compressed low frequency video signals and said compressed extracted values; means for processing the signals corresponding to said compressed line data, said compressed low frequency video signals and said compressed extracted values; and means for transforming the processed line data, the processed low frequency video signals and the processed extracted values so as to form signals corresponding to said elements.

12. An image data encoding method comprising the steps of:

separating low frequency components from elements of a video signal so as to form relatively low frequency video signals and relatively high frequency video signals;

detecting characteristic points from said high frequency video signals and generating line data based upon positions of said characteristic points;

extracting values from said high frequency video signals based on said line data;

compressing said line data, said low frequency video signals, and the extracted values so as to form compressed video signals; and modulating said compressed video signals.

13. An image data decoding method comprising the steps of:

demodulating received modulated compressed video signals so as to obtain signals corresponding to compressed line data, compressed low frequency video signals and compressed extracted values, in which said modulated compressed video signals are obtained by separating low frequency components from elements of a video signal so as to form relatively low frequency video signals and relatively high frequency video signals, detecting characteristic points from said high frequency video signals, generating line data based upon positions of said characteristic points, extracting values from said high frequency video signals based on said line data, compressing said line data, said low frequency video signals and the extracted values so as to respectively form said compressed line data, said compressed low frequency video signals and said compressed extracted values, and modulating said compressed line data, said compressed low frequency video signals and said compressed extracted values;

processing the signals corresponding to said compressed line data, said compressed low frequency video signals and said compressed extracted values; and transforming the processed line data, the processed low frequency video signals and the processed extracted values so as to form signals corresponding to said elements.

* * * * *